(12) United States Patent
Lu et al.

(10) Patent No.: US 11,922,599 B2
(45) Date of Patent: Mar. 5, 2024

(54) VIDEO SUPER-RESOLUTION PROCESSING METHOD AND APPARATUS

(71) Applicant: HUAWEI TECHNOLOGIES CO., LTD., Shenzhen (CN)

(72) Inventors: Wei Lu, Hangzhou (CN); Qi Wang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 137 days.

(21) Appl. No.: 17/680,971

(22) Filed: Feb. 25, 2022

(65) Prior Publication Data
US 2022/0180477 A1    Jun. 9, 2022

Related U.S. Application Data

(63) Continuation of application No. PCT/CN2020/108814, filed on Aug. 13, 2020.

(30) Foreign Application Priority Data

Aug. 29, 2019 (CN) .......................... 201910805436.0

(51) Int. Cl.
G06T 3/40 (2006.01)
H04N 19/139 (2014.01)
H04N 19/176 (2014.01)

(52) U.S. Cl.
CPC ......... G06T 3/4053 (2013.01); H04N 19/139 (2014.11); H04N 19/176 (2014.11)

(58) Field of Classification Search
CPC ......... G06T 3/4053; G06T 2207/20084; G06T 5/001; G06T 5/50; G06T 9/00;
(Continued)

(56) References Cited

U.S. PATENT DOCUMENTS 11,743,483 B2 *  8/2023  Lee ..................... H04N 19/513
                                                375/240.16
2014/0362922 A1 * 12/2014  Puri .................... H04N 19/196
                                                375/240.16
(Continued)

FOREIGN PATENT DOCUMENTS

CN    101651832 A    2/2010
CN    102835106 A    12/2012
(Continued)

OTHER PUBLICATIONS

Wei-Chi Chen et al, "A low-complexity upsampling technique for H.264," 2011 Visual Communications and Image Processing (VCIP), 4 pages.
(Continued)

*Primary Examiner* — Albert H Cutler
(74) *Attorney, Agent, or Firm* — Rimon PC

(57) ABSTRACT

Embodiments of this application provide for a video super-resolution processing method. The method includes obtaining encoded information of a coding block in a video stream. The method further includes determining an inter-frame prediction mode of the coding block based on an inter-frame prediction marker included in the encoded information. The method further includes determining a super-resolution pixel block of the coding block based on the inter-frame prediction mode of the coding block and pixel information of a matched coding block identified by a matched coding block index included in the encoded information. The method further includes stitching super-resolution pixel blocks of all coding blocks that belong to a same image frame in the video stream to obtain a super-resolution image. Power consumption can be reduced while an effect of super-resolution processing performed on a single frame of image in a video is ensured.

20 Claims, 11 Drawing Sheets

(58) Field of Classification Search
CPC ......... G06T 9/001; G06T 9/002; G06T 9/004; H04N 19/139; H04N 19/176; H04N 19/59; H04N 19/109; H04N 19/573; H04N 7/0117; H04N 5/265; H04N 23/951

See application file for complete search history.

(56) References Cited

U.S. PATENT DOCUMENTS

| | | | |
|---|---|---|---|
| 2016/0191940 A1 | 6/2016 | Wang et al. | |
| 2018/0192070 A1* | 7/2018 | Dupuis | H04N 19/513 |
| 2020/0186809 A1* | 6/2020 | Mukherjee | H04N 19/176 |

FOREIGN PATENT DOCUMENTS

| | | |
|---|---|---|
| CN | 103489173 A | 1/2014 |
| CN | 106960416 A | 7/2017 |
| CN | 108235058 A | 6/2018 |
| CN | 108781291 A | 11/2018 |
| CN | 109840888 A | 6/2019 |
| CN | 109922339 A | 6/2019 |
| CN | 110136066 A | 8/2019 |
| EP | 2410746 A1 | 1/2012 |
| IN | 108495128 A | 9/2018 |

OTHER PUBLICATIONS

Dong C, Loy C C, Tang X.,"Accelerating the super-resolution convolutional neural network", European Conference on Computer Vision. Springer International Publishing, 2016: 391-407.

* cited by examiner

VIDEO SUPER-RESOLUTION PROCESSING METHOD AND APPARATUS

CROSS-REFERENCE TO RELATED APPLICATIONS

This application is a continuation of International Application No. PCT/CN2020/108814, filed on Aug. 13, 2020, which claims priority to Chinese Patent Application No. 201910805436.0, filed on Aug. 29, 2019. The disclosures of the aforementioned applications are hereby incorporated by reference in their entireties.

TECHNICAL FIELD

This application generally relates to the field of computer technologies, and in particular, to a video super-resolution processing method and apparatus.

BACKGROUND

Conventionally, definition of a video (or an image) is determined by resolution of an image. Low-resolution (LR) means that definition of the image is comparatively low, and high-resolution (HR) means that definition of the image is comparatively high. To obtain a high-resolution video source, a most direct method is to use a high-resolution image sensor. However, the high-resolution video source is extremely scarce in daily life. Storage and transmission of the high-resolution video source may impose a heavy burden on a current transmission network. Therefore, a super-resolution (SR) technology is proposed to restore a high-resolution video on a basis of an existing low-resolution video source. The super-resolution technology improves resolution of an original image by using hardware or software. A process of obtaining a high-resolution image from a series of low-resolution images is super-resolution reconstruction.

Currently, there are many existing image super-resolution algorithms, and a video can also be decomposed into single-frame images for super-resolution processing. An entire image is captured from a video stream, super-resolution processing is performed on the entire captured image by using a convolutional neural network, and finally an image obtained after super-resolution processing is retransmitted to the video stream. An effect of image super-resolution processing is positively correlated with a depth and a scale of a convolutional neural network model, but the depth and the scale of the convolutional neural network model are limited by a processing capability and power consumption of a processor (a central processing unit (CPU), a graphics processing unit (GPU), and/or an embedded neural-network processing unit (NPU)). Therefore, while ensuring the effect of image super-resolution processing, the processor may need to perform a large quantity of convolution operations to run the convolutional neural network that is for super-resolution processing. The power consumption may also increase with an increase in a calculation amount of the processor. In addition, super-resolution processing of the video can be decomposed into super-resolution processing of each frame of image in the video, and there is a comparatively large amount of pixel data in each frame of image in the video. Therefore, when the processor performs super-resolution processing on each frame of image, processing time is comparatively long because of a large amount of data, and super-resolution processing delays of any two frames of images in the video also increase with an increase in a calculation amount of the processor.

SUMMARY

Embodiments of this application provide a video super-resolution processing method and apparatus, which can reduce power consumption while ensuring an effect of super-resolution processing performed on a single frame of image in a video, and shorten super-resolution processing delays of any two frames of images in the video.

The following describes this application from different aspects. It should be understood that reference may be made to each other for implementations and beneficial effects of the following different aspects.

According to a first aspect, an embodiment of this application provides a video super-resolution processing method, where the method includes: A terminal device may obtain encoded information of a coding block in a video stream, where the encoded information may include a reference image frame index, a matched coding block index, and an inter-frame prediction marker. The terminal device may determine an inter-frame prediction mode of the coding block based on the inter-frame prediction marker, and may determine a super-resolution pixel block of the coding block based on the inter-frame prediction mode of the coding block and pixel information of a matched coding block identified by the matched coding block index. The terminal device may stitch super-resolution pixel blocks of all coding blocks that belong to a same image frame in the video stream to obtain a super-resolution image, and may combine super-resolution images of all image frames in the video stream into a super-resolution video for output. A coding block belongs to an image frame in the video stream, and the image frame in the video stream includes a plurality of coding blocks. The matched coding block identified by the matched coding block index is a coding block that is in a reference image frame identified by the reference image frame index and that has a minimum pixel difference from the coding block. The super-resolution pixel block of the coding block is a pixel block obtained after the super-resolution processing is performed on pixel information of the coding block.

Compared with direct super-resolution processing performed on an entire image frame, in some embodiments of this application, the terminal device performs different super-resolution processing on coding blocks in a P frame based on different inter-frame prediction modes of the coding blocks, to obtain super-resolution pixel blocks, and then stitches the super-resolution pixel blocks to obtain a super-resolution image. This not only implements the super-resolution processing of an entire image frame, but also can reduce a calculation amount while ensuring an effect of the super-resolution processing is performed on a single frame of image in a video, thereby reducing power consumption and shortening super-resolution processing delays of any two frames of images in the video.

With reference to the first aspect, in a possible implementation, that the terminal device determines the super-resolution pixel block of the coding block based on the inter-frame prediction mode of the coding block and pixel information of a matched coding block identified by the matched coding block index may be: When the inter-frame prediction mode is a first-type prediction mode (that is, a skip mode), it indicates that the pixel information of the coding block is the same as the pixel information of the matched coding block, and it also indicates that there is no pixel prediction residual between a coding block in the skip mode and a matched coding block of the coding block. In this case, the terminal device may directly use a matched super-resolution pixel block of the matched coding block as the super-resolution pixel block of the coding block. The matched super-resolution pixel block may be a pixel block obtained after the super-resolution processing is performed on the pixel information of the matched coding block. A time sequence of the reference image frame is prior to a time sequence of an image frame to which the coding block belongs. Therefore, the terminal device has obtained a super-resolution image of the reference image frame when processing the coding block, and thus can directly obtain the matched super-resolution pixel block of the matched coding block in the reference image frame. When the inter-frame prediction mode of the coding block is the skip mode, the terminal device in some embodiments of this application directly uses the matched super-resolution pixel block that is obtained as the super-resolution pixel block of the coding block, and does not need to perform super-resolution processing on the pixel information of the coding block. Therefore, power consumption generated during the super-resolution processing can be reduced, that is, power consumption of the terminal device is reduced. In addition, time for the super-resolution processing of a single frame of image can be shortened, and thus super-resolution processing delays of any two frames of images can be shortened.

With reference to the first aspect, in a possible implementation, that the terminal device determines the super-resolution pixel block of the coding block based on the inter-frame prediction mode of the coding block and pixel information of a matched coding block identified by the matched coding block index may further be: When the inter-frame prediction mode is a second-type prediction mode (that is, a merge mode or an inter-frame adaptive motion vector prediction (AMVP) mode), it indicates that the pixel information of the coding block is not completely the same as the pixel information of the matched coding block, and it also indicates that there is a pixel prediction residual between a coding block in the skip mode and a matched coding block of the coding block. In this case, the terminal device may obtain a pixel prediction residual in the encoded information of the coding block, may determine the pixel information of the code based on the pixel information of the matched coding block and the pixel prediction residual, and then may input the pixel information of the coding block into a super-resolution model for the super-resolution processing, to obtain the super-resolution pixel block of the coding block. When the inter-frame prediction mode of the coding block is the merge mode or the AMVP mode, the terminal device in some embodiments of this application inputs the pixel information of the coding block into the super-resolution model for the super-resolution processing. This can ensure a super-resolution effect of the super-resolution pixel block, thereby ensuring a super-resolution effect of an entire image frame.

With reference to the first aspect, in a possible implementation, the pixel information may be a pixel matrix, and the pixel prediction residual may be a pixel residual matrix. When determining the pixel information of the code based on the pixel information of the matched coding block and the pixel prediction residual, the terminal device may use a sum of a pixel matrix of the matched coding block and the pixel residual matrix as a pixel matrix of the coding block.

With reference to the first aspect, in a possible implementation, when inputting the pixel information of the coding block into the super-resolution model for the super-resolution processing, to obtain the super-resolution pixel block of the coding block, the terminal device may obtain a first pixel region in the coding block (that is, an edge region in the coding block), may perform pixel padding on the first pixel region (that is, perform edge compensation on the edge region), and then may input pixel information of the post-pixel-padding first pixel region into the super-resolution model for the super-resolution processing, to obtain a first pixel block corresponding to the coding block (that is, perform super-resolution processing on the edge region on which edge compensation has been performed). Further, the terminal device may perform super-resolution processing on the pixel information of the coding block, and may stitch the first pixel block and a pixel block obtained after the super-resolution processing is performed on the pixel information of the coding block, to obtain the super-resolution pixel block of the coding block (that is, stitch a result obtained after the super-resolution processing is performed on the edge region and a result obtained after the super-resolution processing is performed on the coding block, to obtain a complete super-resolution pixel block). The pixel information of the first pixel region may be pixel information in the pixel information of the coding block except for pixel information of a second pixel region, and the second pixel region is a pixel region (that is, a central region) of a preset size in the coding block. The terminal device in some embodiments of this application extracts the edge region of the coding block, then performs the super-resolution processing on the post-pixel-padding edge region to obtain the first pixel block, and finally stitches the first pixel block and the pixel block obtained after the super-resolution processing is performed on the pixel information of the coding block, to obtain the super-resolution pixel block of the coding block. This can significantly ease a problem of a boundary between coding blocks, and can further ensure a super-resolution processing effect of a single frame of image.

With reference to the first aspect, in a possible implementation, when obtaining the first pixel region of the coding block (that is, the edge region of the coding block), the terminal device may determine the second pixel region of the preset size in the coding block (that is, the central region in the coding block), and determine, as the first pixel region (that is, the edge region of the coding block), a region that is in the coding block and that does not overlap with the second pixel region. The preset size may be determined based on a convolutional layer quantity and a convolution kernel size that are of the super-resolution model.

With reference to the first aspect, in a possible implementation, the encoded information further includes a motion vector predictor (MVP) and/or a motion vector difference (MVD). That the terminal device stitches super-resolution pixel blocks of all coding blocks that belong to a same image frame in the video stream to obtain a super-resolution image may be: The terminal device may determine a motion vector (MV) of the coding block based on the inter-frame prediction mode, and the MVP and/or the MVD, may determine, based on the MV and a location of the matched coding block in the reference image frame, a location of the coding block in an image frame to which the coding block belongs, and finally, may stitch the super-resolution pixel blocks of all the coding blocks that belong to the same image frame in the video stream based on locations of all the coding blocks in the image frame to which all the coding blocks belong, to obtain the super-resolution image of the image frame to which all the coding blocks belong. The terminal device in some embodiments of this application determines the MV based on different inter-frame prediction modes, and determines, by using the MV, the location of the coding block in the image frame to which the coding block belongs, thereby ensuring that the super-resolution pixel block is in a correct location during stitching, and that a complete super-resolution image is obtained.

With reference to the first aspect, in a possible implementation, the terminal device determines the motion vector MV of the coding block based on the inter-frame prediction mode, and the MVP and/or the MVD. When the inter-frame prediction mode of the coding block is the first-type prediction mode (the skip mode), the terminal device uses the MVP in the encoded information as the motion vector MV of the coding block; and when the inter-frame prediction mode of the coding block is the second-type prediction mode (the merge mode or the AMVP mode), the terminal device uses a sum of the MVP and the MVD that are in the encoded information as the MV of the coding block, where the MVD is 0 in the merge mode.

With reference to the first aspect, in a possible implementation, a frame type of the image frame to which the coding block belongs is a P frame.

With reference to the first aspect, in a possible implementation, the video stream further includes a first image frame whose frame type is an I frame. The method may further include: When a frame type of an image frame to which a coding block in the video stream belongs is the I frame, the terminal device may obtain pixel information of the first image frame, and then may input the pixel information of the first image frame into the super-resolution model for the super-resolution processing, to obtain a super-resolution image of the first image frame, where the first image frame herein indicates the I frame.

The terminal device may further combine the super-resolution images of all the image frames in the video stream into the super-resolution video.

The terminal device in some embodiments of this application uses different super-resolution processing manners for image frames of different frame types in a video stream. For a P frame, the terminal device performs super-resolution processing on each coding block in the P frame. For an I frame, the terminal device directly performs super-resolution processing on a complete I-frame image. This improves the video super-resolution processing method, and ensures a super-resolution processing effect of each image frame in the video stream.

According to a second aspect, an embodiment of this application provides a video super-resolution processing apparatus, where the video super-resolution processing apparatus includes units and/or modules configured to perform the video super-resolution processing method provided in any one of the first aspect and/or the possible implementations of the first aspect, and therefore can also implement beneficial effects (or advantages) of the video super-resolution processing method provided in the first aspect.

According to a third aspect, an embodiment of this application provides a terminal device, including a processor and a memory, where the memory is configured to store a computer program, the computer program includes program instructions, and when the processor runs the program instructions, the terminal device performs the video super-resolution processing method provided in the first aspect. The terminal device may further include a receiver, where the receiver is configured to receive a video stream transmitted on a network.

According to a fourth aspect, an embodiment of this application provides a computer program product, where the computer program product includes computer program code, and when the computer program code is run on a computer, the computer is enabled to perform the video super-resolution processing method provided in the first aspect.

According to a fifth aspect, an embodiment of this application provides a chip, including a processor. The processor is configured to read and execute a computer program stored in a memory, to perform the video super-resolution processing method provided in any possible implementation of the first aspect. Optionally, the chip further includes the memory, and the memory is connected to the processor by using a circuit or a wire. Further optionally, the chip further includes a communications interface, and the processor is connected to the communications interface. The communications interface is configured to receive data and/or information that needs to be processed. The processor obtains the data and/or information from the communications interface, processes the data and/or information, and outputs a processing result through the communications interface. The communications interface may be an input/output interface.

Optionally, the processor and the memory may be physically independent units, or the memory may be integrated with the processor.

According to a sixth aspect, an embodiment of this application provides a computer-readable storage medium. The computer-readable storage medium stores computer program instructions. When the computer program instructions are run on a computer, the computer is enabled to perform the video super-resolution processing method provided in the first aspect.

The embodiments of this application are implemented, which can reduce power consumption while ensuring a super-resolution processing effect of a single-frame image in a video, and can also shorten super-resolution processing delays of any two frames of images in the video.

BRIEF DESCRIPTION OF DRAWINGS

FIG. 7a-1 and FIG. 7a-2 are a schematic diagram of determining a super-resolution pixel block according to an embodiment of this application;

DESCRIPTION OF EMBODIMENTS

The following clearly and completely describes the technical solutions in the embodiments of this application with reference to the accompanying drawings in the embodiments of this application.

The video super-resolution processing method provided in the embodiments of this application is applicable to video processing application scenarios such as a video call, a video conference, video playing (including a video on demand, a video on live, playing of film and television works or short videos, and the like), video surveillance, and video recording.

Figure 1:
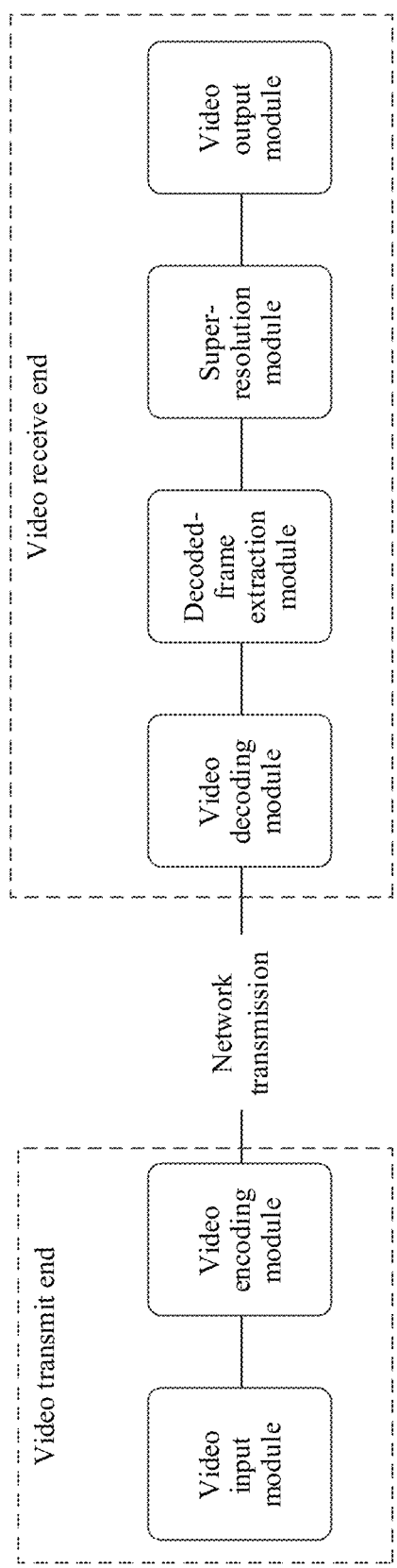
FIG. 1 is a schematic diagram of a system architecture according to an embodiment of this application.

In some feasible implementations, a system architecture in the foregoing application scenarios may usually include a video transmit end and a video receive end. FIG. 1 is a schematic diagram of a system architecture according to an embodiment of this application. A video transmit end may include a video input module and a video encoding module; the video input module may be a camera; and the video encoding module may be a video encoder. A video receive end may include a video decoding module, a decoded-frame extraction module, a super-resolution module, and a video output module; the video decoding module may be a video decoder; the super-resolution module may include a super-resolution model; and the video output module may be a display. The video transmit end may input a video collected or stored by the video input module into the video encoding module for video compression coding. The video is transmitted from the video transmit end to the video receive end through network transmission. The video receive end may input the video received from a network into the video decoding module for video decoding, extract a decoded frame of the video by using the decoded-frame extraction module, perform super-resolution processing on the decoded frame of the video by using the super-resolution module, and finally output, by using the video output module, a video obtained after super-resolution processing. Optionally, network transmission may include wired network transmission and wireless network transmission. A medium for wired network transmission may be a coaxial cable, a network cable (twisted pair), or an optical fiber. A carrier for wireless network transmission may be a radio wave, and a wireless network may include a wireless local area network, a wireless metropolitan area network, a wireless personal network, and the like.

In a video call, a video conference, or a video on live scenario, the video transmit end may be a terminal that has shooting and video encoding functions, such as a mobile phone, a notebook computer, a tablet computer, a desktop computer, or a conference terminal; and the video receive end may be a terminal that has video decoding and display functions, such as a mobile phone, a notebook computer, a tablet computer, a desktop computer, or a conference terminal. In a video on demand scenario, or a scenario of playing film and television works or a short video, the video transmit end may be a cloud server, and the video input module may be storage space of the cloud server, where the storage space of the cloud server may store various film and television works, short videos, video on demand resources (such as audio and video programs), and the like; and the video receive end may be a terminal that has video decoding and display functions, such as a mobile phone, a notebook computer, a desktop computer, a tablet computer, or a smart TV. In a video surveillance scenario, the video transmit end may be a device that has surveillance camera shooting and video encoding functions, such as a network camera (the network camera is an advanced camera device that integrates shooting, video encoding, and world wide web services); and the video receive end may be a terminal that has video decoding and display functions, such as a mobile phone, a notebook computer, a tablet computer, or a desktop computer.

In some other feasible implementations, the system architecture provided in some embodiments of this application may include only a video receive end. In this case, the video receive end may include a video receiving module, a video decoding module, a decoded-frame extraction module, a super-resolution module, and a video output module. The video receive end may include a user interface or a camera. The video decoding module may be a video decoder, the super-resolution module may include a super-resolution model, and the video output module may be a display. The video receive end may receive a video transmitted on a network or collect a video recorded by a camera, input the video into the video decoding module for video decoding, extract a decoded frame of the video by using the decoded-frame extraction module, perform super-resolution processing on the decoded frame of the video by using the super-resolution module, and finally output, by using the video output module, a video obtained after super-resolution processing. The user interface may be configured to receive a video transmitted on the network. For example, in a video recording scenario, the system architecture may include only a video receive end. In this case, the video receive end may be a device that has a video shooting function, such as a mobile phone. In some other feasible implementations, a video receive end (or referred to as a terminal) may read a locally stored video, perform super-resolution processing, and then display locally a video obtained after super-resolution processing, or send a video obtained after super-resolution processing to another device for display.

For ease of understanding, some terms (nouns) related to the method provided in the embodiments of this application are briefly described in the following.

1. Video Compression Coding

From a viewpoint of information theory, data describing a signal source is a sum of information and data redundancy, that is, data=information+data redundancy. There are many types of data redundancy, such as spatial redundancy, temporal redundancy, visual redundancy, and statistical redundancy. When an image serves as a signal source, the essence of video compression coding is to reduce the data redundancy in the image.

Commonly used video compression coding standards include high efficiency video coding (HEVC, also referred to as H.265). A main idea of the HEVC is to search a single frame of image or a plurality of frames of images for pixel blocks (or macroblocks) with redundant information. In a video compression process, these pixel blocks with redundant information are described by some information (such as pixel prediction residuals and motion vector differences) rather than original pixel values, thereby achieving high efficiency video compression. An HEVC process may include inter-frame prediction and motion estimation.

2. Inter-Frame Prediction

Inter-frame prediction may indicate that a pixel of a current image is predicted by using a correlation between video image frames, that is, a time domain correlation, and by using a pixel of an adjacent encoded image (that is, a reference image frame), to achieve an objective of removing time domain redundancy from a video (or implementing image compression). A difference between the pixel of the current image and the pixel of the adjacent encoded image is a pixel prediction residual.

3. Motion Estimation

Each frame of image in a video is divided into a plurality of non-overlapping macroblocks (pixel blocks), and it is considered that all pixels in each macroblock have same displacement (that is, location coordinates of the pixels in the image are the same). For any macroblock i of a plurality of macroblocks in one frame of image, a macroblock that has a minimum pixel difference from the macroblock i, that is, a matched block, is searched for within a specific search range of a reference image frame (that is, a reference frame) according to a specific matching rule. Relative displacement between the matched block and the macroblock i may be a motion vector (MV), and a process of obtaining the motion vector may be referred to as motion estimation. The minimum pixel difference may indicate a minimum rate distortion cost in high efficiency video coding. A commonly used matching rule may include a minimum mean square error, a minimum average absolute error, a maximum quantity of matched pixels, and the like. A search algorithm for the high efficiency video coding H.265 may include a full search algorithm and a TZSearch algorithm. The macroblock may be referred to as a coding block at a video receive end, and the matched block may be referred to as a matched coding block at the video receive end.

4. Motion Vector Difference

A difference between an MV of a current block (for example, the macroblock i) and a motion vector of a candidate block (that is, a motion vector predictor (MVP)) is a motion vector difference (MVD), and the candidate block may be a macroblock adjacent to an image frame to which the current block belongs.

In some feasible implementations, because a video may be a series of consecutive images, super-resolution processing of the video may be decomposed into super-resolution processing of a single frame of image, and an image obtained after super-resolution processing is an image whose magnification is an integer multiple relative to an original image. Image super-resolution processing performed by a mobile terminal is used as an example for description. The mobile terminal may divide an image (or a picture) into a plurality of image blocks; perform mathematical interpolation stretching on an image block with less texture information in the plurality of image blocks, to obtain an enlarged image block; input an image block with more texture information in the plurality of image blocks into a super-resolution model (a convolutional neural network) for super-resolution processing; and finally stitch an image block obtained after mathematical interpolation stretching and an image block output by the super-resolution model, to obtain a super-resolution image. During image super-resolution processing performed by the mobile terminal, an image is also stretched and magnified through mathematical interpolation, but definition of an image block obtained after mathematical interpolation processing is lower than definition of an image block obtained after super-resolution processing performed by using the super-resolution model. Therefore, when two adjacent image blocks in an image are processed differently (in other words, mathematical interpolation stretching is performed on the image block of the adjacent image blocks, and super-resolution processing is performed on the other image block of the adjacent image blocks by using the super-resolution model), definition of two post-processing adjacent image blocks is different. Therefore, an obvious boundary problem occurs after the two post-processing adjacent image blocks are stitched. Optionally, the super-resolution model may be any neural network model of a super-resolution convolutional neural network (SRCNN), a fast super-resolution convolutional neural network (FSRCNN), accurate image super-resolution using a very deep convolutional network (VDSR), a cascading residual network (CARN), or multi-objective reinforced evolution in mobile neural architecture search (MNAS-A).

To address a problem that an effect of image super-resolution processing (including a definition problem and a boundary problem) and power consumption cannot be balanced in image super-resolution processing performed by the mobile terminal, this application provides a video super-resolution processing method. The method can reduce power consumption while ensuring an effect of super-resolution processing performed on a single frame of image in a video, resolve a problem of a boundary between adjacent image blocks in a single frame of image, and further shorten super-resolution processing delays of any two frames of images in the video. Therefore, a stalling problem that occurs when a larger-scale super-resolution model performs video super-resolution processing can be resolved.

In some feasible implementations, the video super-resolution processing method provided in this application may be applied to a video receive end, for example, used in a super-resolution module in FIG. 1. The video receive end may be a terminal device such as a mobile phone, a notebook computer, a tablet computer, a smart TV, an augmented reality (AR) device/a virtual reality (VR) device, or an autonomous driving device, or another type of device. For ease of description, the video super-resolution processing method provided in this application is described in the following by using a terminal device as an example.

Figure 2:
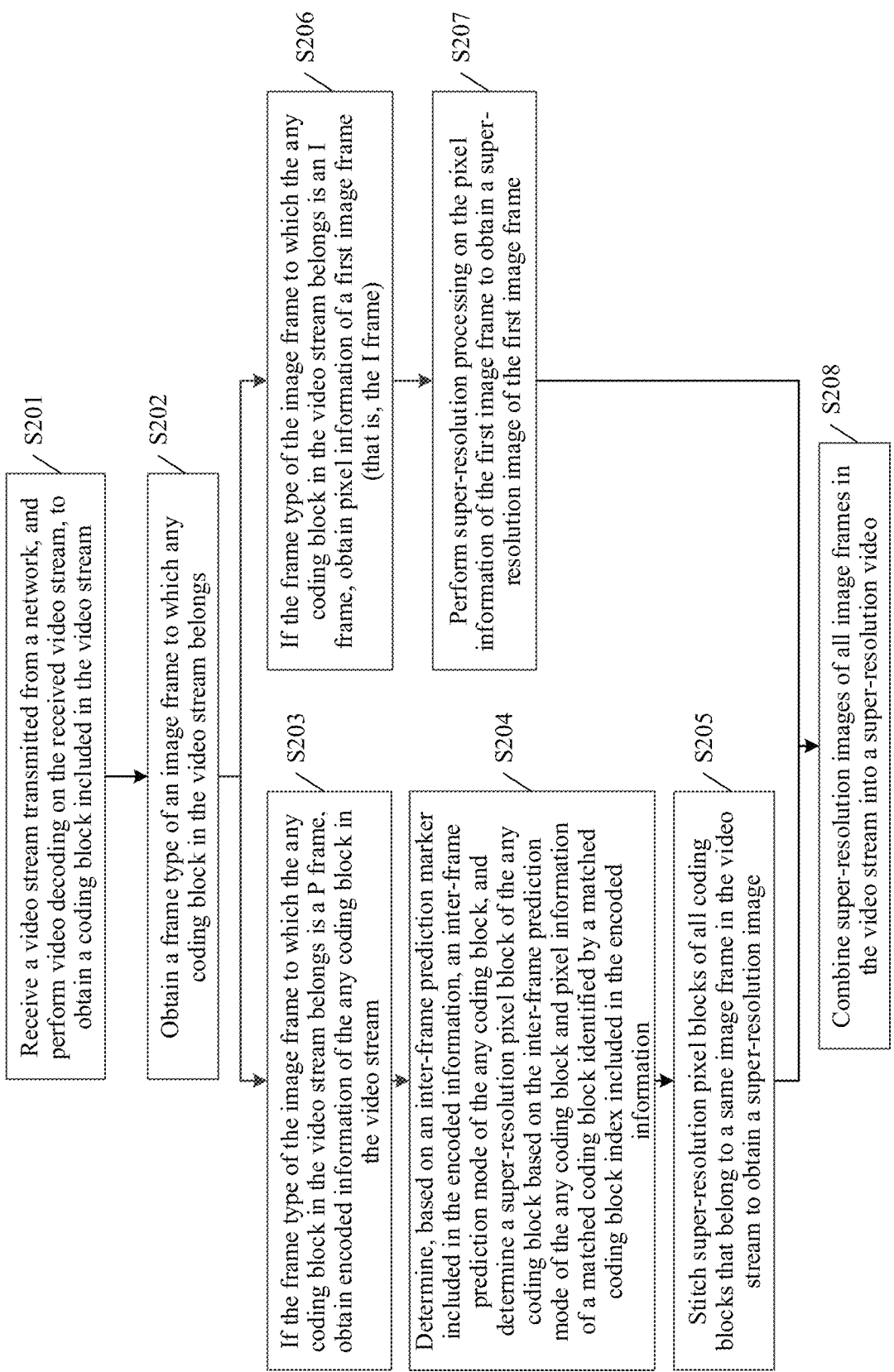
FIG. 2 is a schematic flowchart of a video super-resolution processing method according to an embodiment of this application.

FIG. 2 is a schematic flowchart of a video super-resolution processing method according to an embodiment of this application. As shown in FIG. 2, the video super-resolution processing method provided in some embodiments of this application may include the following steps.

S201: Receive a video stream transmitted from a network, and perform video decoding on the received video stream, to obtain a coding block included in the video stream.

In some feasible implementations, the video stream provided in some embodiments of this application may be a real-time video stream, for example, a video stream during a video call or a video stream during live broadcast, or may be a video stream stored in a cloud server, for example, a video stream of a movie or a TV series. A type of the video stream is not limited to these embodiments of this application.

In some feasible implementations, a terminal device may receive, by using various video applications (APP), the video stream transmitted on the network, and may perform video decoding on the received video stream, to obtain the coding block included in the video stream. The video stream may include a plurality of coding blocks, a coding block may belong to an image frame in the video stream, the image frame may include a plurality of coding blocks, and a plurality of image frames may belong to the same video stream. Optionally, an image obtained after decoding of the video stream is completed may be buffered in a decoded picture buffer (DPB), to be used as a reference image of a subsequent image frame.

S202: Obtain a frame type of an image frame to which any coding block in the video stream belongs.

Figure 3:
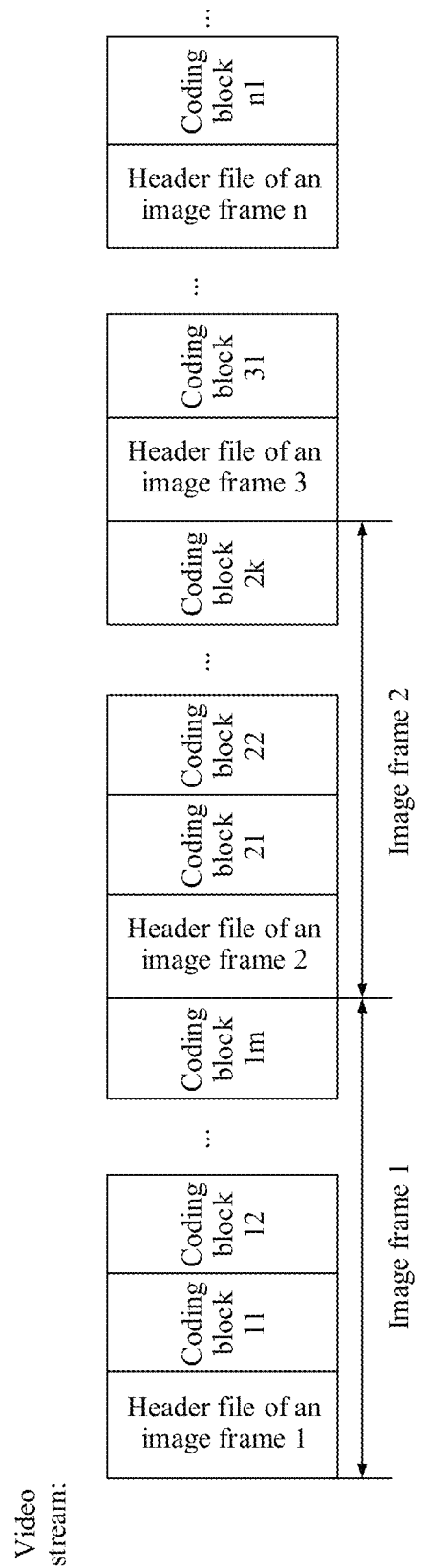
FIG. 3 is a schematic diagram of locations of header files of image frames according to an embodiment of this application.

In some feasible implementations, each image frame in the video stream has a header file, and the header file of the image frame may include information such as a frame type identifier and an image frame index (the image frame index may be used to identify a frame that is in the video stream and to which an image frame belongs). FIG. 3 is a schematic diagram of locations of header files of image frames according to an embodiment of this application. As shown in FIG. 3, m coding blocks of coding blocks 11, 12, ..., and 1m in a video stream all belong to an image frame 1, k coding blocks of coding blocks 21, 22, ..., and 2k all belong to an image frame 2, and n image frames of image frames 1, 2, ..., and n belong to the video stream, where m and k may be the same or different, and n, m, and k each are greater than 1. When the video stream is transmitted on the network, the header file of each image frame is transmitted in a form of a hexadecimal code segment. Therefore, the terminal device may obtain a header file of the image frame to which the coding block in the video stream belongs, and may determine, based on a frame type identifier in the header file, the frame type of the image frame to which the coding block belongs. For example, when the frame type identifier is "5", it is determined that the frame type of the image frame to which the coding block belongs is an I frame; or when the frame type identifier is "1", it is determined that the frame type of the image frame to which the coding block belongs is a P frame. If the frame type of the image frame to which the coding block belongs is the P frame, the terminal device performs step S203 to step S205 after step S202. If the frame type of the image frame to which the coding block belongs is the I frame, the terminal device performs step S206 and step S207 after step S202.

S203: If the frame type of the image frame to which the coding block in the video stream belongs is the P frame, obtain encoded information of the coding block in the video stream.

In some feasible implementations, the encoded information may include information such as a reference image frame index, an inter-frame prediction marker, a matched coding block index, and/or a coding block size. The inter-frame prediction marker may be used to identify an inter-frame prediction mode used by the coding block. The matched coding block index may be used to identify a matched coding block. The matched coding block may be a coding block that is in another image frame (an image frame other than the image frame to which the coding block belongs) and that has a minimum pixel difference (a minimum rate distortion cost) from the coding block. The reference image frame index may be used to identify an image frame to which the matched coding block belongs. The coding block size may be a size of a coding block, for example, 8×8 pixels, 16×16 pixels, or 32×32 pixels. The inter-frame prediction mode provided in some embodiments of this application may include an inter-frame mode (AMVP mode), a skip mode, and a merge mode. The inter-frame prediction mode used by the coding block may be any one of the AMVP mode, the skip mode, or the merge mode.

S204: Determine, based on the inter-frame prediction marker included in the encoded information, the inter-frame prediction mode of the coding block, and determine a super-resolution pixel block of the coding block based on the inter-frame prediction mode of the coding block and pixel information of the matched coding block identified by the matched coding block index included in the encoded information.

Figure 4:
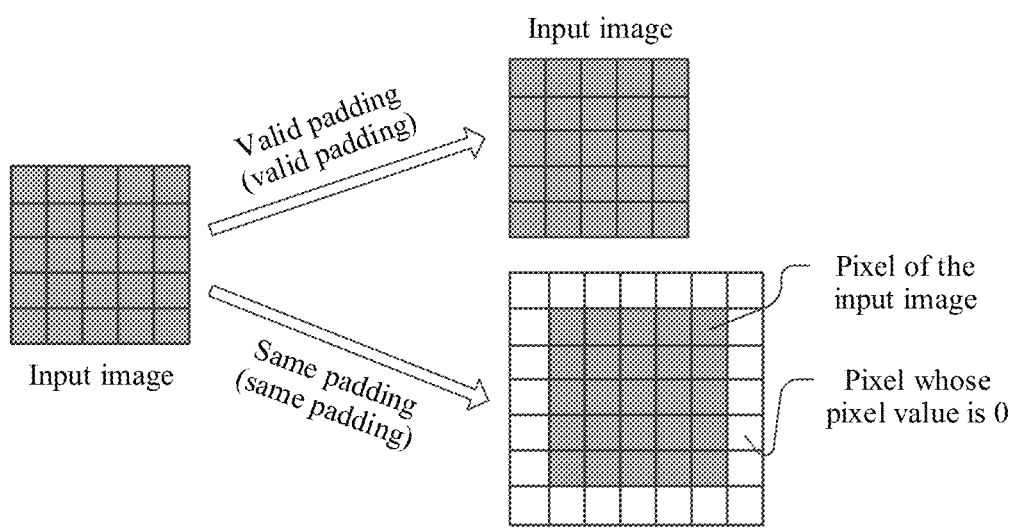
FIG. 4 is a schematic diagram of valid padding and same padding according to an embodiment of this application.

In some feasible implementations, the encoded information may include the reference image frame index, the matched coding block index, the inter-frame prediction marker, and the like. The super-resolution pixel block may include a pixel block obtained after super-resolution processing is performed on pixel information of the coding block by a super-resolution model. The super-resolution model may be a convolutional neural network model. In a process of convolution feature extraction performed by using the convolutional neural network model, because a dimension of a feature map output by a convolutional layer of a convolutional neural network after a convolution operation is performed is less than a dimension of an input image (for example, the dimension of the input image is 3×3, a size of a convolution kernel is 3×3, and the dimension of the feature map output by the convolution layer after the convolution operation is performed is 1×1), edge pixel padding is required during convolution feature extraction, so that a size (or dimension) of the feature map output by the convolution layer is consistent with a size (or dimension) of the input image. There are two commonly used edge pixel padding manners: valid padding and same padding. FIG. 4 is a schematic diagram of valid padding and same padding according to an embodiment of this application. As shown in FIG. 4, for the valid padding, pixel value padding is not performed on an input image, in other words, a convolution feature of the input image is directly extracted during convolution feature extraction; and if a quantity of remaining pixels is less than a size of a convolution kernel, the remaining pixels are directly discarded. For the same padding, pixels whose pixel values are 0 are padded around the input image, in other words, a convolution feature of an input image obtained after padding with zero-value pixels is performed is extracted during convolution feature extraction; and if the quantity of the remaining pixels is less than the size of the convolution kernel, pixels whose pixel values are 0 are padded so that a quantity of pixels obtained after padding is the same as the size of the convolution kernel.

Figure 5:
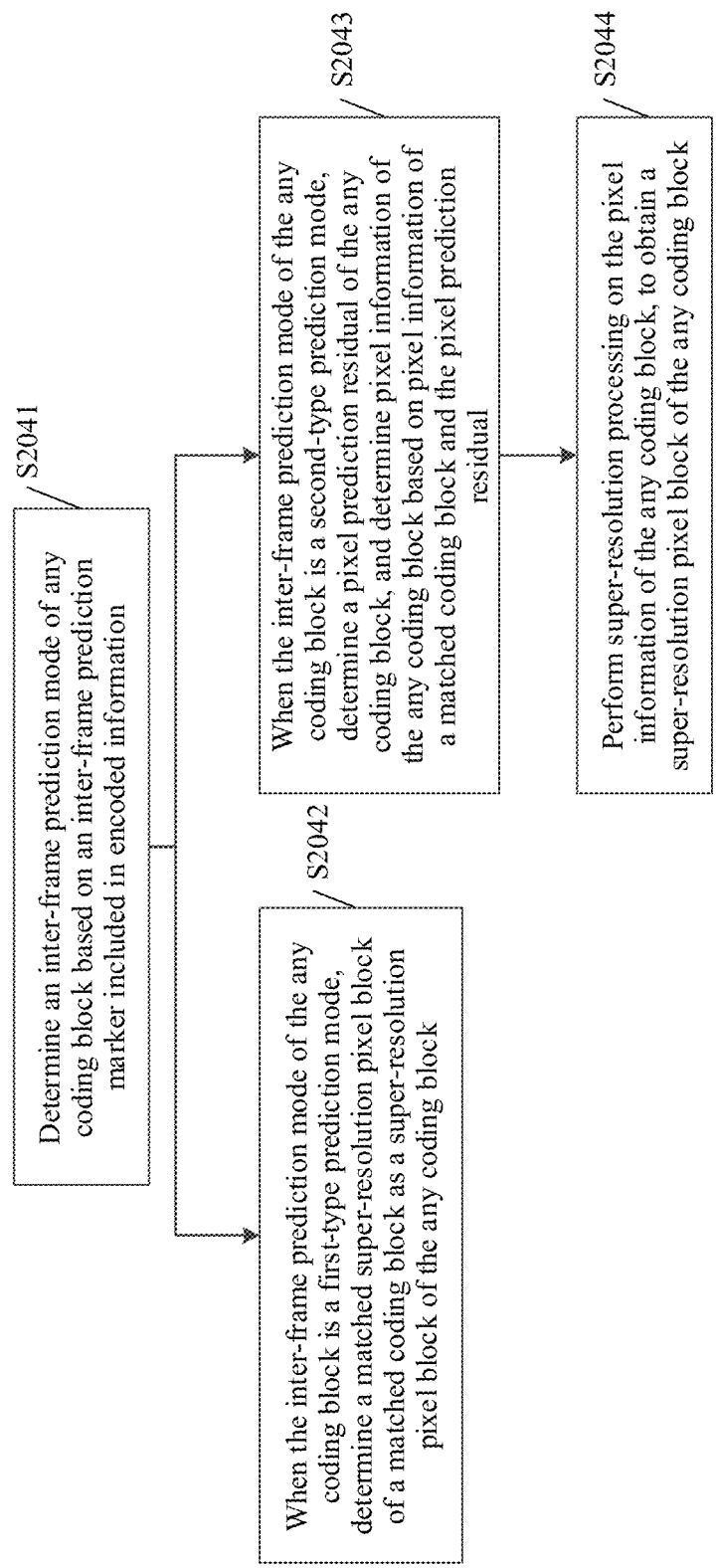
FIG. 5 is a schematic flowchart of determining a super-resolution pixel block according to an embodiment of this application.

In some feasible implementations, referring to FIG. 5, FIG. 5 is a schematic flowchart of determining a super-resolution pixel block according to an embodiment of this application. In step S204, the determining a super-resolution pixel block of the coding block may include the following steps.

S2041: Determine the inter-frame prediction mode of the coding block based on the inter-frame prediction marker included in the encoded information.

In some feasible implementations, the terminal device may determine the inter-frame prediction mode identified by the inter-frame prediction marker in the encoded information as the inter-frame prediction mode of the coding block. For example, when the inter-frame prediction marker is "2", it is determined that the inter-frame prediction mode of the coding block is the AMVP mode; when the inter-frame prediction marker is "1", it is determined that the inter-frame prediction mode of the coding block is the merge mode; and when the inter-frame prediction marker is "0", it is determined that the inter-frame prediction mode of the coding block is the skip mode.

S2042: When the inter-frame prediction mode of the coding block is a first-type prediction mode, determine a matched super-resolution pixel block of the matched coding block as the super-resolution pixel block of the coding block.

In some feasible implementations, there is no pixel prediction residual in the skip mode of high efficiency video coding, but there is a pixel prediction residual in the merge mode and the AMVP mode of the high efficiency video coding. Therefore, in some embodiments of this application, the skip mode in which there is no pixel prediction residual may be used as the first-type prediction mode, and the merge mode and the AMVP mode in which there is the pixel prediction residual may be used as a second-type prediction mode. When the inter-frame prediction mode of the coding block is the first-type prediction mode, the terminal device may obtain the matched super-resolution pixel block corresponding to the matched coding block in a reference image frame identified by the reference image frame index in the encoded information. In the skip mode, the pixel information of the coding block is the same as the pixel information of the matched coding block. Therefore, the terminal device may determine the matched super-resolution pixel block of the matched coding block as the super-resolution pixel block of the coding block. The matched super-resolution pixel block may include a pixel block obtained after super-resolution processing is performed on the pixel information of the matched coding block by using the super-resolution model. A coding block size of the coding block may be the same as a coding block size of the matched coding block. For example, the coding block size of the coding block is 8×8 pixels, and the coding block size of the matched coding block is also 8×8 pixels. A time sequence of the reference image frame in the video stream is prior to a time sequence of the image frame to which the coding block belongs, that is, the reference image frame is an image frame before the image frame to which the coding block belongs. Therefore, before the super-resolution pixel block corresponding to the matched coding block is obtained, super-resolution pixel blocks are obtained for all coding blocks in the reference image frame, and thus the matched super-resolution pixel block of the matched coding block previously obtained may be directly obtained. In addition, because the terminal device directly uses the matched super-resolution pixel block obtained as the super-resolution pixel block of the coding block, super-resolution processing does not need to be performed on the pixel information of the coding block. Therefore, power consumption generated during super-resolution processing can be reduced, that is, power consumption of the terminal device is reduced. In addition, time for super-resolution processing of a single frame of image can be shortened, and thus super-resolution processing delays of any two frames of images can be shortened.

S2043: When the inter-frame prediction mode of the coding block is the second-type prediction mode, determine a pixel prediction residual of the coding block, and determine the pixel information of the coding block based on the pixel information of the matched coding block and the pixel prediction residual.

In some feasible implementations, because there is the pixel prediction residual in the second-type prediction mode (for example, the merge mode and the AMVP mode), when the inter-frame prediction mode of the coding block is the second-type prediction mode, the terminal device may obtain the pixel prediction residual of the coding block, and may obtain the pixel information of the matched coding block in the reference image frame. Because the reference image frame is the image frame before the image frame to which the coding block belongs, before the coding block is processed, pixel information of all the coding blocks in the reference image frame is determined. Therefore, the pixel information of the matched coding block may be directly obtained. The terminal device may determine the pixel information of the coding block based on the pixel prediction residual and the pixel information of the matched coding block. For example, a result obtained after the pixel prediction residual is superimposed on the pixel information of the matched coding block is used as the pixel information of the coding block. The coding block size of the coding block may be the same as the coding block size of the matched coding block. If both the pixel prediction residual and the pixel information may be represented by a set, for example, the pixel prediction residual is represented by a set pixel-s, and the pixel information is represented by a set pixel-m, a size of the set pixel-m may be the same as a size of the set pixel-s. That is, a quantity of elements in the set pixel-m may be equal to a quantity of elements in the set pixel-s; and superimposing the pixel prediction residual on the pixel information may be adding the elements in the one set and the corresponding elements in the other set.

In some feasible implementations, the pixel prediction residual may be a pixel residual matrix, and the pixel information may be a pixel matrix. The terminal device may determine a sum of the pixel matrix of the matched coding block and the pixel residual matrix that are obtained as a pixel matrix of the coding block. A size of the pixel matrix may be the same as a size of the pixel residual matrix, and an element in the pixel matrix may be a pixel value of a pixel.

S2044: Perform super-resolution processing on the pixel information of the coding block, to obtain the super-resolution pixel block of the coding block.

In some feasible implementations, after determining the pixel information of the coding block, the terminal device may input the pixel information of the coding block into the super-resolution model for super-resolution processing, and may obtain a pixel block output by the super-resolution model for the pixel information of the coding block. The terminal device may determine the pixel block output by the super-resolution model as the super-resolution pixel block of the coding block. The pixel information may be a pixel matrix. In this case, the edge pixel padding manner used by the super-resolution model may be the same padding, that is, a "padding" parameter of a super-resolution mode is "same". The terminal device performs super-resolution processing on pixel information of a coding block by using the super-resolution model, a super-resolution effect of the coding block can be ensured, and the super-resolution model may be a small-scale model (for example, a super-resolution model whose model size is less than 100 KB). Therefore, a stalling problem that occurs when a larger-scale super-resolution model performs video super-resolution processing can be resolved.

In some feasible implementations, the terminal device may determine a preset size, then may determine, in the coding block, a pixel region (a central region) whose size is the preset size, and may use the determined pixel region as a second pixel region. The terminal device may use, as a first pixel region (an edge region), a region that is in the coding block and that does not overlap with the second pixel region. In this case, pixel information of the first pixel region may be pixel information in the pixel information of the coding block except for pixel information of the second pixel region (that is, the central region). The terminal device may perform pixel padding on the first pixel region, and may input the pixel information of the post-pixel-padding first pixel region into the super-resolution model for super-resolution processing, to obtain a first pixel block corresponding to the coding block. The terminal device may perform pixel stitching on the first pixel block and a pixel block obtained after the super-resolution model performs super-resolution processing on the pixel information of the coding block, to obtain the super-resolution pixel block of the coding block. The terminal device extracts the edge region of the coding block, then performs super-resolution processing on the post-pixel-padding edge region to obtain the first pixel block, and finally stitches the first pixel block and the pixel block obtained after super-resolution processing is performed on the pixel information of the coding block, to obtain the super-resolution pixel block of the coding block. This can significantly ease a problem of a boundary between coding blocks, and thus can ensure a super-resolution processing effect of a single frame of image. A super-resolution processing manner of the pixel information of the post-pixel-padding first pixel region is the same as that of the pixel information of the coding block, that is, the same super-resolution model is used; and in this case, an edge pixel padding manner used by the super-resolution model may be the valid padding, that is, a "padding" parameter of a super-resolution mode is "valid". The preset size may be determined based on a convolutional layer quantity and a convolution kernel size that are of the super-resolution model.

Figure 6:
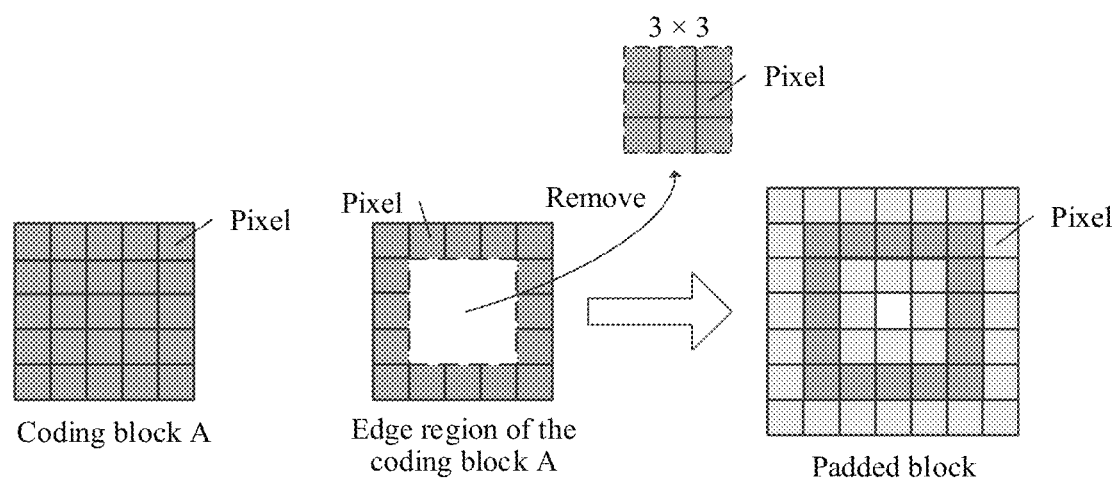
FIG. 6 is a schematic diagram of pixel padding in a first pixel region according to an embodiment of this application.

For example, FIG. 6 is a schematic diagram of pixel padding in a first pixel region according to an embodiment of this application. In FIG. 6, it is assumed that the determined preset size is 3×3, the coding block is a coding block A, and a coding block size of the coding block A is 5×5 pixels. The terminal device extracts an edge region of the coding block A. As shown in FIG. 6, the extracted edge region is a circle of pixels on the outermost periphery of the coding block A. The terminal device performs pixel padding on the edge region of the coding block A to obtain a padded block shown in FIG. 6.

In some feasible implementations, step S2043 and step S2044 in some embodiments of this application may be performed before step S2042, step S2043 and step S2044 may be performed after step S2042, or step S2043 and step S2044 may be alternatively performed simultaneously with step S2042. An execution order of step S2043 and step S2044, and step S2042 is not limited to these embodiments of this application.

S205: Stitch super-resolution pixel blocks of all coding blocks that belong to a same image frame in the video stream to obtain a super-resolution image.

Figures 1, 7A:
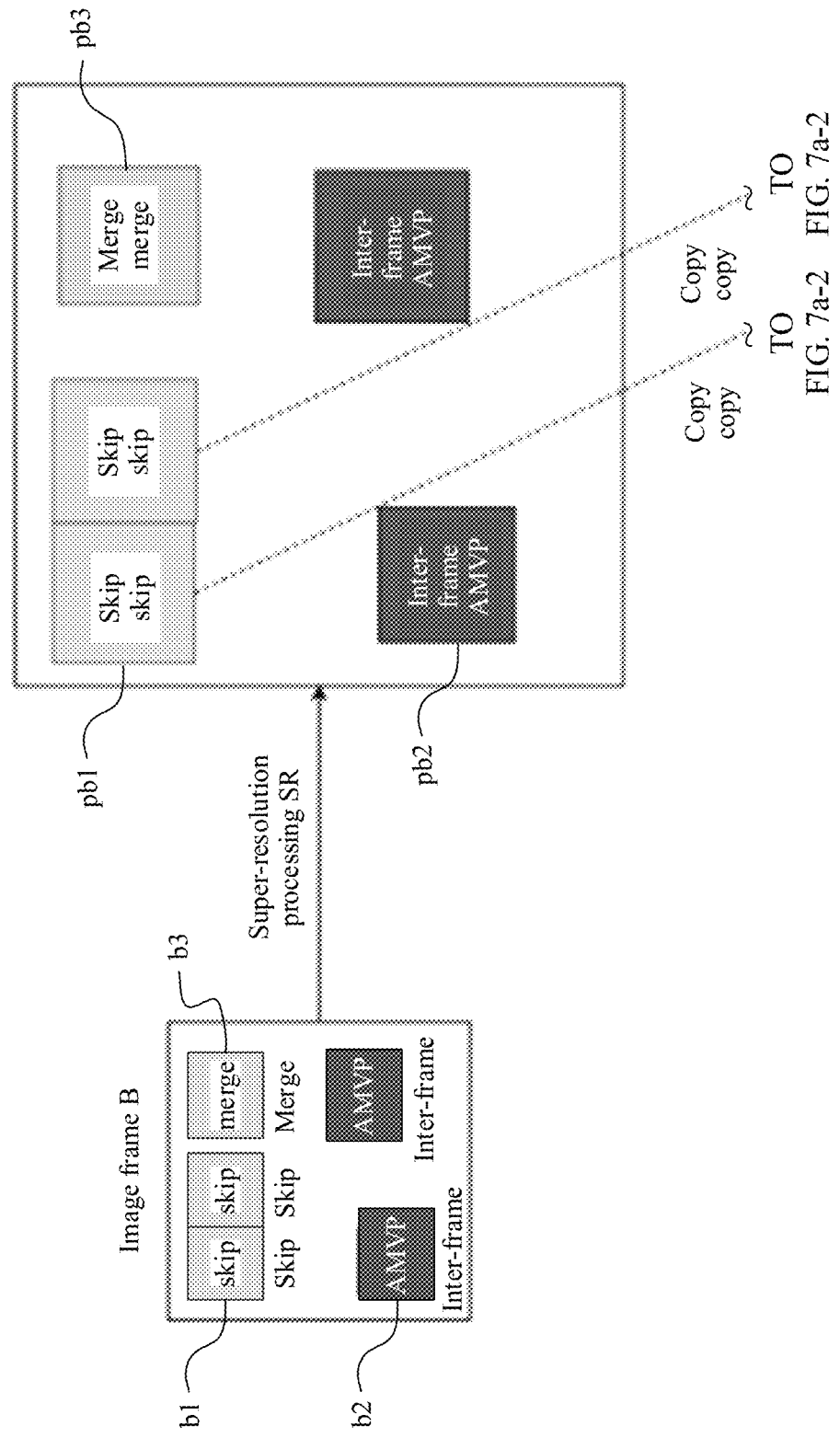
Figures 2, 7A:
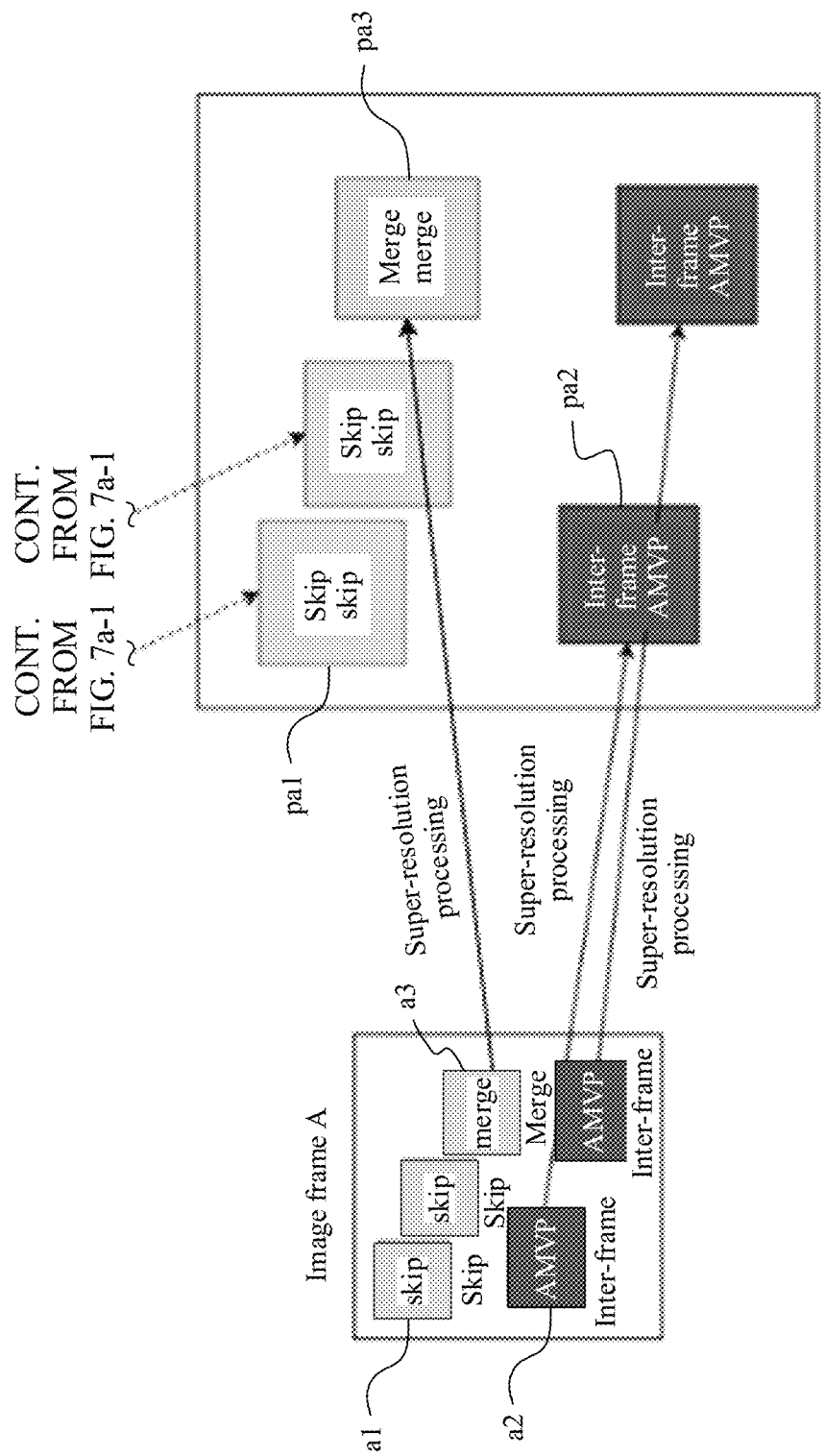

In some feasible implementations, the terminal device may obtain, according to the implementation of step S203 and step S204, the super-resolution pixel blocks of all the coding blocks that belong to the same image frame (a frame type of the image frame is the P frame) in the video stream. For example, FIG. 7*a*-1 and FIG. 7*a*-2 are a schematic diagram of determining a super-resolution pixel block according to an embodiment of this application. As shown in FIG. 7*a*-1 and FIG. 7*a*-2, a reference image frame of an image frame A is an image frame B, where b1 is a coding block whose inter-frame prediction mode is the skip mode, b2 is a coding block whose inter-frame prediction mode is the AMVP mode, b3 is a coding block whose inter-frame prediction mode is the merge mode, and the coding blocks b1, b1, and b3 all belong to the image frame B. A super-resolution pixel block corresponding to b1 is pb1, a super-resolution pixel block corresponding to b2 is pb2, and a super-resolution pixel block corresponding to b3 is pb3. In FIG. 7*a*-2, a1 is a coding block whose inter-frame prediction mode is the skip mode, a2 is a coding block whose inter-frame prediction mode is the AMVP mode, a3 is a coding block whose inter-frame prediction mode is the merge mode, and the coding blocks a1, a1, and a3 all belong to the image frame A. A super-resolution pixel block corresponding to a1 is pa1, a super-resolution pixel block corresponding to a2 is pa2, and a super-resolution pixel block corresponding to a3 is pa3. A matched coding block of the coding block a1 is b1 in the image frame B, a matched coding block of the coding block a2 is b2 in the image frame B, and a matched coding block of the coding block a3 is b3 in the image frame B. In FIG. 7*a*-2, because the inter-frame prediction mode of a1 is the first-type prediction mode, pa1 is the same as pb1; and because the inter-frame prediction modes of a2 and a3 are the second-type prediction mode, super-resolution processing is separately performed on pixel information of a2 and a3, to obtain pa2 and pa3.

After obtaining the super-resolution pixel blocks of all the coding blocks that belong to the same image frame (the frame type of the image frame is the P frame) in the video stream, the terminal device may stitch the super-resolution pixel blocks of all the coding blocks that belong to the same image frame, to obtain the super-resolution image. The super-resolution image is used for generating a super-resolution video. The encoded information of the coding block may further include an image frame index, a motion vector predictor MVP and/or a motion vector difference MVD, and the like. When the inter-frame prediction mode of the coding block is the first-type prediction mode (the skip mode), the MVP in the encoded information is used as a motion vector MV of the coding block; and when the inter-frame prediction mode of the coding block is the second-type prediction mode (the merge mode or the AMVP mode), a sum of the MVP and the MVD in the encoded information is used as the MV of the coding block, where the MVD in the merge mode is 0. The terminal device may obtain a location of the matched coding block in the reference image frame, and may determine, based on the MV and the location of the matched coding block in the reference image frame, a location of the coding block in an image frame (that is, an image frame identified by the image frame index) to which the coding block belongs. The terminal device may stitch the super-resolution pixel blocks of all the coding blocks that belong to the same image frame in the video stream based on locations of all the coding blocks in the image frame to which all the coding blocks belong, to obtain the super-resolution image of the image frame to which all the coding blocks belong. An image frame that is earlier in a time sequence in the video stream may be used as a reference image frame of an image frame that is later in the time sequence in the video stream. The terminal device may generate the super-resolution video based on super-resolution images of all the image frames in the video stream. The terminal device uses different super-resolution processing manners for coding blocks with different inter-frame prediction modes, to implement super-resolution processing on an entire image frame, and reduce a calculation amount of the super-resolution model. Therefore, power consumption can be reduced on a premise that an effect of super-resolution processing performed on a single frame of image in a video is ensured, and super-resolution processing delays of any two frames of images in the video can be shortened.

Figure 7B:
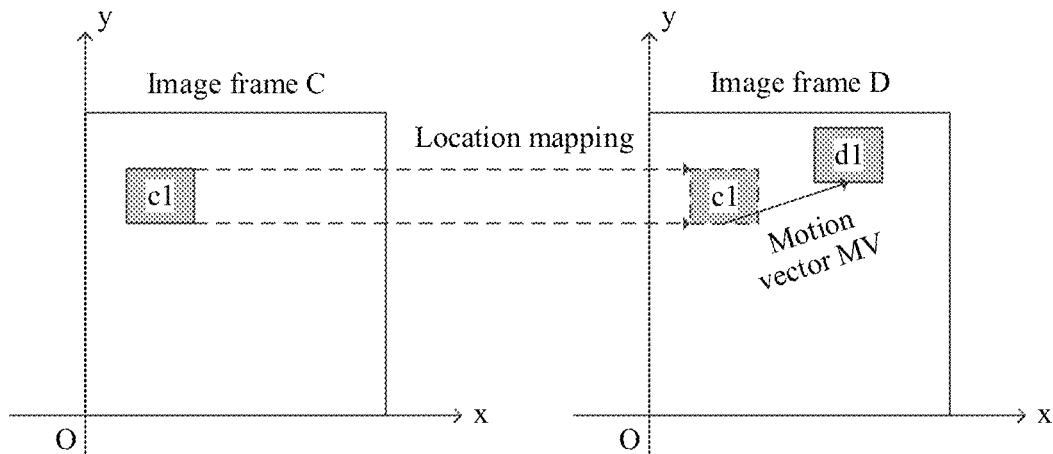
FIG. 7b is a schematic diagram of locations of coding blocks according to an embodiment of this application.

For example, FIG. 7*b* is a schematic diagram of locations of coding blocks according to an embodiment of this application. As shown in FIG. 7*b*, a coding block in an image frame is used as an example. It is assumed that an image frame to which a coding block d1 belongs is an image frame D, an image frame to which a coding block c1 belongs is an image frame C, a reference image frame of the image frame D is the image frame C, and a matched coding block of the coding block d1 is c1. In FIG. 7*b*, the image frames are placed in a two-dimensional coordinate system (an origin O, an x-axis, and a y-axis). It is assumed that displacements of pixels in one coding block relative to the origin O are the same. If a location of the coding block c1 in the image frame C is a location shown in FIG. 7b, the terminal device may map the location of the coding block c1 in the image frame C to the image frame D, and then move the coding block c1 in the image frame D based on a motion vector MV (including a magnitude and a direction). In this case, a location of the coding block d1 in the image frame D is obtained.

S206: If the frame type of the image frame to which the coding block in the video stream belongs is the I frame, refer to the image frame to which the coding block belongs as a first image frame, and obtain pixel information of the first image frame.

In some feasible implementations, if the frame type of the image frame to which the coding block in the video stream belongs and that is obtained in step S202 is the I frame, the terminal device may obtain all coding blocks that belong to the same image frame as the coding block, and may stitch the coding block and all the coding blocks that belong to the same image frame as the coding block to obtain the first image frame to which the code belongs. The terminal device may obtain the pixel information of the first image frame, where the pixel information of the first image frame may include pixel information of all the coding blocks that belong to the first image frame. During stitching, the coding blocks are stitched together based on locations of the coding blocks in the image frame, to obtain the image frame.

Figure 8:
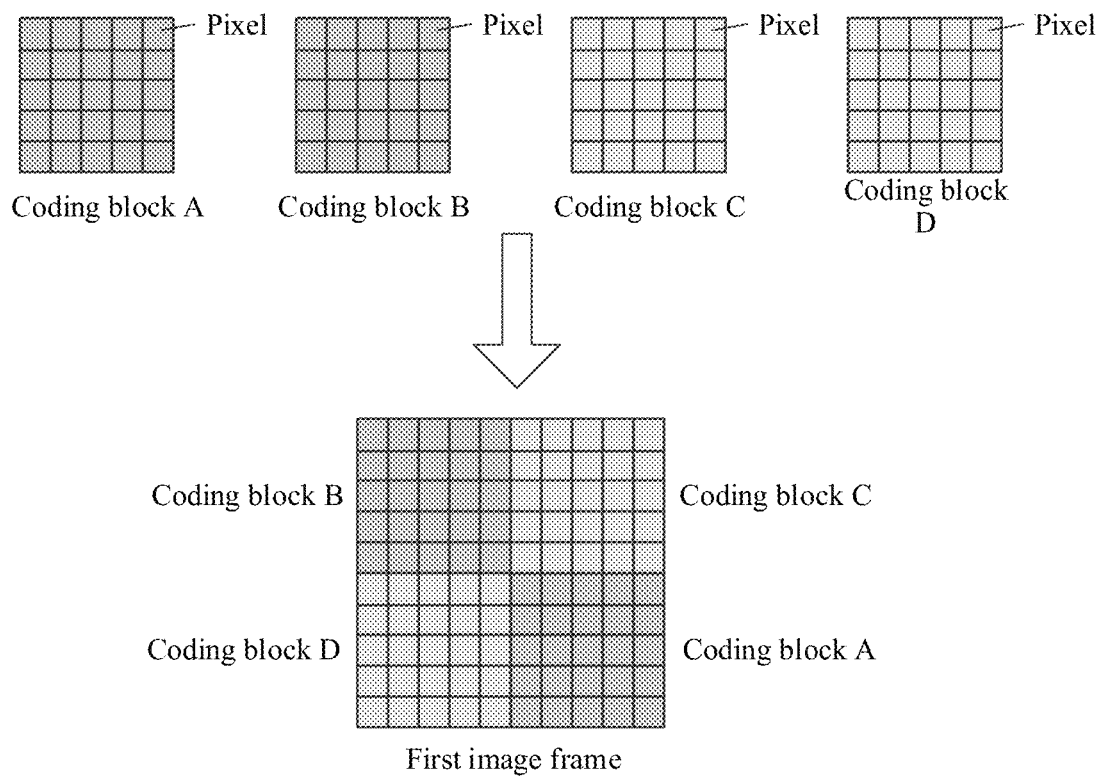
FIG. 8 is a schematic diagram of coding block stitching according to an embodiment of this application.

For example, FIG. 8 is a schematic diagram of coding block stitching according to an embodiment of this application. In FIG. 8, it is assumed that the coding block is a coding block A, and coding blocks that belong to a same image frame as the coding block A include a coding block B, a coding block C, and a coding block D. The terminal device stitches the coding block A, the coding block B, the coding block C, and the coding block D based on a location of each of the coding blocks in the image frame, to obtain the first image frame.

S207: Perform super-resolution processing on the pixel information of the first image frame to obtain a super-resolution image of the first image frame.

In some feasible implementations, the terminal device may input the pixel information of the first image frame into the super-resolution model for super-resolution processing, to obtain the super-resolution image output by the super-resolution model for the pixel information of the first image frame, where the super-resolution image may be used for generating a super-resolution video. The terminal device uses different processing manners for image frames of different frame types in the video stream. For the P frame, the terminal device performs super-resolution processing on each coding block in the P frame; and for the I frame, the terminal device directly performs super-resolution processing on a complete I-frame image. This improves the video super-resolution processing method, and ensures a super-resolution processing effect of each image frame in the video stream.

S208: Combine super-resolution images of all image frames in the video stream into the super-resolution video.

In some feasible implementations, the video stream includes a plurality of image frames; and the terminal device may obtain the super-resolution images of all the image frames in the video stream, and combine the super-resolution images of all the image frames in the video stream into the super-resolution video for output.

In some embodiments of this application, when the frame type of the image frame to which the coding block in the video stream belongs is the P frame, the terminal device determines the inter-frame prediction mode of the coding block based on the inter-frame prediction marker in the encoded information of the coding block. When the inter-frame prediction mode of the coding block is the skip mode or the merge mode, the terminal device uses the matched super-resolution pixel block of the matched coding block in the reference image as the super-resolution pixel block of the coding block. When the inter-frame prediction mode of the coding block is the AMVP mode, the terminal device performs super-resolution processing on the pixel information of the coding block, to obtain the super-resolution pixel block of the coding block. Finally, the terminal device stitches the super-resolution pixel blocks of all the coding blocks that belong to the same image frame in the video stream, to obtain the super-resolution image, where the super-resolution image is used for generating the super-resolution video. In some embodiments of this application, different processing is performed on coding blocks based on different inter-frame prediction modes in the P frame to obtain super-resolution pixel blocks, and the super-resolution pixel blocks are stitched to obtain a super-resolution image. This can reduce power consumption while ensuring an effect of super-resolution processing performed on a single frame of image in a video, and shorten super-resolution processing delays of any two frames of images in the video.

Figure 9:
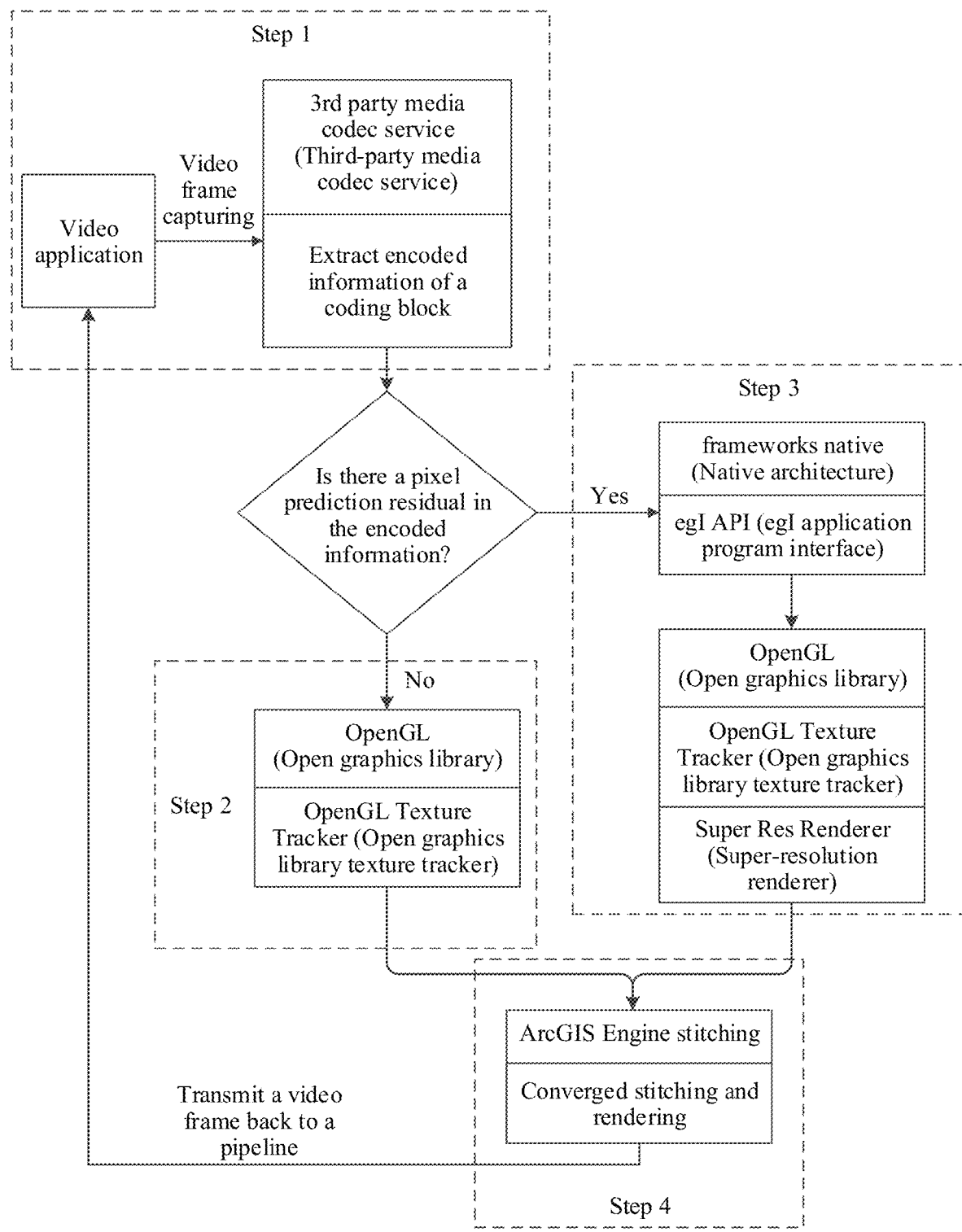
FIG. 9 is a schematic diagram of internal implementation of super-resolution processing performed by a terminal device on a P frame according to an embodiment of this application.

In an optional embodiment, the video super-resolution processing method provided in some embodiments of this application may be mainly applied to a P frame in a video stream. Therefore, for ease of understanding, internal implementation of super-resolution processing performed by a terminal device on a P frame in a video stream is briefly described by using the P frame in the video stream as an example in some embodiments of this application. FIG. 9 is a schematic diagram of internal implementation of super-resolution processing performed by a terminal device on a P frame according to an embodiment of this application.

Step 1: The terminal device extracts encoded information of a coding block by using a third-party media codec service (3rd party media codec service).

Step 2: If there is no pixel prediction residual in the encoded information, the terminal device obtains, by using an open graphics library (OpenGL) texture tracker (OpenGL Texture Tracker), a result obtained after super-resolution processing is performed on a matched coding block that is in a reference image frame and that has same pixels as the coding block.

If there is no pixel prediction residual in the encoded information, it indicates that an inter-frame prediction mode of the coding block is a skip mode.

Step 3: If there is a pixel prediction residual in the encoded information, the terminal device performs super-resolution processing on the coding block by using the OpenGL texture tracker and a super-resolution renderer (Super Res Renderer).

If there is the pixel prediction residual in the encoded information, it indicates that the inter-frame prediction mode of the coding block is an inter-frame mode (AMVP mode) or a merge mode. When performing super-resolution processing on the coding block, the terminal device may not only input pixel information of the coding block into a super-resolution model for super-resolution processing, but also extract an edge region of the coding block, and perform pixel padding on the edge region. Then, the terminal device inputs pixel information of the post-pixel-padding edge region into the super-resolution model for super-resolution processing. Finally, the terminal device may stitch a result obtained after super-resolution processing is performed on the coding block and a result obtained after super-resolution processing is performed on the post-pixel-padding edge region, to obtain a super-resolution pixel block of the complete coding block.

Step 4: The terminal device performs converged stitching and rendering on results of step 2 and step 3 that are performed on a same video frame (or image frame) by using an image stitching technology (for example, ArcGIS Engine), to obtain a super-resolution image.

After the super-resolution image is obtained, the super-resolution image may be returned, by transmitting a video frame back to a pipeline, to a video application for output and display.

In some embodiments of this application, in the P frame, when there is no pixel prediction residual in the encoded information of the coding block, the terminal device directly uses a result obtained after super-resolution processing is performed on the matched coding block that is in the reference image frame (an I frame) and that has the same pixels as the coding block as a result obtained after super-resolution processing is performed on the coding block, and does not need to perform super-resolution processing on the coding block again. Therefore, power consumption generated during super-resolution processing can be reduced, that is, power consumption of the terminal device is reduced. In addition, time for super-resolution processing of a single frame of image can be shortened, and thus super-resolution processing delays of any two frames of images can be shortened. When there is the pixel prediction residual in the encoded information of the coding block, the terminal device needs to perform super-resolution processing on the coding block, so that a super-resolution effect of the coding block can be ensured. Therefore, a super-resolution effect of a super-resolution image can be ensured, where the super-resolution image is obtained by stitching results obtained after super-resolution processing is performed on all coding blocks in a same image frame.

The video super-resolution processing method in some embodiments of this application is described above in detail. To help better implement the foregoing solutions in some embodiments of this application, an embodiment of this application further provides a corresponding apparatus and device.

Figure 10:
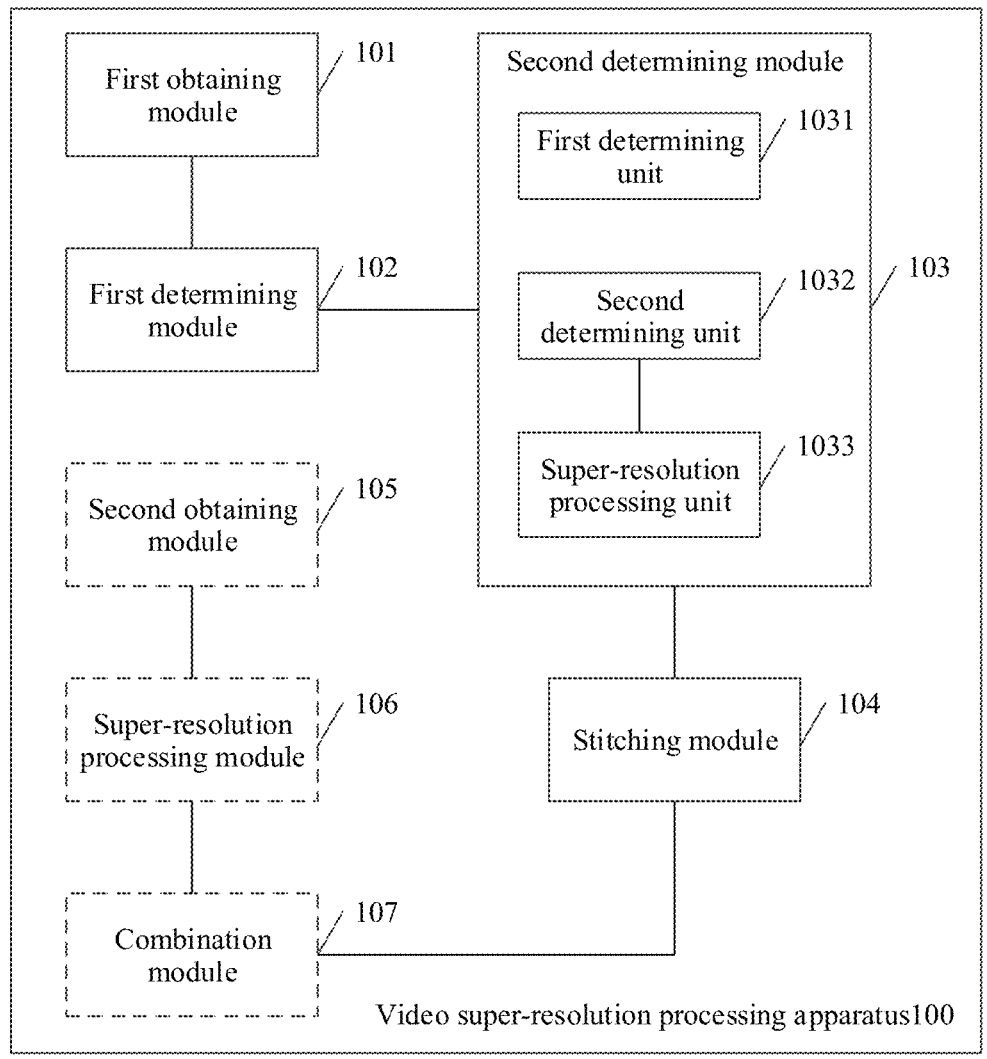
FIG. 10 is a schematic structural diagram of a video super-resolution processing apparatus according to an embodiment of this application.

FIG. 10 is a schematic structural diagram of a video super-resolution processing apparatus according to an embodiment of this application. As shown in FIG. 10, the video super-resolution processing apparatus 100 includes:

a first obtaining module 101, configured to obtain encoded information of any coding block in a video stream; a first determining module 102, configured to determine an inter-frame prediction mode of the coding block based on an inter-frame prediction marker included in the encoded information obtained by the first obtaining module 101; a second determining module 103, configured to determine a super-resolution pixel block of the coding block based on the inter-frame prediction mode determined by the first determining module 102 and pixel information of a matched coding block, where the super-resolution pixel block is a pixel block obtained after super-resolution processing is performed on pixel information of the coding block; and a stitching module 104, configured to stitch super-resolution pixel blocks of all coding blocks that belong to a same image frame in the video stream to obtain a super-resolution image, where the super-resolution image is used for generating a super-resolution video. A coding block belongs to an image frame in the video stream; the image frame in the video stream includes a plurality of coding blocks; the encoded information includes a reference image frame index, a matched coding block index, and the inter-frame prediction marker; and the matched coding block identified by the matched coding block index is a coding block that is in a reference image frame identified by the reference image frame index and that has a minimum pixel difference from the coding block.

In some feasible implementations, the pixel information of the coding block is the same as pixel information of the matched coding block. The second determining module 103 may include a first determining unit 1031. The first determining unit 1031 is configured to: when the inter-frame prediction mode determined by the first determining module 102 is a first-type prediction mode, determine a matched super-resolution pixel block of the matched coding block as the super-resolution pixel block of the coding block, where the matched super-resolution pixel block includes a pixel block obtained after super-resolution processing is performed on the pixel information of the matched coding block.

In some feasible implementations, the second determining module 103 may further include a second determining unit 1032 and a super-resolution processing unit 1033. The second determining unit 1032 is configured to: when the inter-frame prediction mode determined by the first determining module 102 is a second-type prediction mode, determine a pixel prediction residual of the coding block, and determine the pixel information of the coding block based on the pixel information of the matched coding block and the pixel prediction residual. The super-resolution processing unit 1033 is configured to perform super-resolution processing on the pixel information that is of the coding block and that is determined by the second determining unit, to obtain the super-resolution pixel block of the coding block.

In some feasible implementations, the super-resolution processing unit 1033 may be configured to:

obtain a first pixel region in the coding block; perform pixel padding on the first pixel region, and perform super-resolution processing on pixel information of the post-pixel-padding first pixel region to obtain a first pixel block corresponding to the coding block; and perform super-resolution processing on the pixel information of the coding block, and stitch the first pixel block and a pixel block obtained after super-resolution processing is performed on the pixel information of the coding block, to obtain the super-resolution pixel block of the coding block. The pixel information of the first pixel region is pixel information in the pixel information of the coding block except pixel information of a second pixel region, and the second pixel region is a pixel region of a preset size in the coding block.

In some feasible implementations, the super-resolution processing unit 1033 may further be configured to: determine the second pixel region of the preset size in the coding block, and determine, as the first pixel region, a region that is in the coding block and that does not overlap with the second pixel region.

In some feasible implementations, the encoded information may further include a motion vector predictor MVP and/or a motion vector difference MVD. The stitching module 104 may be configured to: determine a motion vector MV of the coding block based on the inter-frame prediction mode, and the MVP and/or the MVD; determine, based on the MV and a location of the matched coding block in the reference image frame, a location of the coding block in an image frame to which the coding block belongs; and stitch the super-resolution pixel blocks of all the coding blocks that belong to the same image frame in the video stream based on locations of all the coding blocks in the image frame to which all the coding blocks belong, to obtain a super-resolution image corresponding to the image frame to which all the coding blocks belong.

In some feasible implementations, a frame type of the image frame to which the coding block belongs is a P frame.

In some feasible implementations, the video stream further includes a first image frame whose frame type is an I frame. The apparatus 100 further includes a second obtaining module 105 and a super-resolution processing module 106. The second obtaining module 105 is configured to obtain pixel information of the first image frame. The super-resolution processing module 106 is configured to perform super-resolution processing on the pixel information that is of the first decoded image frame and that is obtained by the second obtaining module, to obtain a super-resolution image of the first decoded image frame.

In some feasible implementations, the apparatus 100 may further include a combination module 107. The combination module 107 is configured to combine super-resolution images of all image frames in the video stream into the super-resolution video.

The first obtaining module 101, the first determining module 102, the second determining module 103, the stitching module 104, the second obtaining module 105, and the super-resolution processing module 106, and/or the combination module 107 may be one module, for example, a processing module. The first determining unit 1031 and the second determining unit 1032, and/or the super-resolution processing unit 1033 may also be one unit, for example, a processing unit.

For implementation of each module and/or unit, reference may further made to corresponding descriptions of the terminal device in the method embodiment shown in FIG. 2 or FIG. 5, so that the method and the functions performed by the terminal device in the foregoing embodiment are performed.

In some embodiments of this application, when the frame type of the image frame to which the coding block in the video stream belongs is the P frame, the video super-resolution processing apparatus determines the inter-frame prediction mode of the coding block based on the inter-frame prediction marker in encoded information of the coding block. When the inter-frame prediction mode of the coding block is a skip mode or a merge mode, the video super-resolution processing apparatus uses the matched super-resolution pixel block of the matched coding block in the reference image as the super-resolution pixel block of the coding block; or when the inter-frame prediction mode of the coding block is an AMVP mode, the video super-resolution processing apparatus performs super-resolution processing on the pixel information of the coding block, to obtain the super-resolution pixel block of the coding block. Finally, the video super-resolution processing apparatus stitches the super-resolution pixel blocks of all the coding blocks that belong to the same image frame in the video stream, to obtain the super-resolution image, where the super-resolution image is used for generating the super-resolution video. In some embodiments of this application, different processing is performed on coding blocks based on different inter-frame prediction modes in the P frame to obtain super-resolution pixel blocks, and the super-resolution pixel blocks are stitched to obtain a super-resolution image. This can reduce power consumption while ensuring an effect of super-resolution processing performed on a single frame of image in a video, and shorten super-resolution processing delays of any two frames of images in the video.

Figure 11:
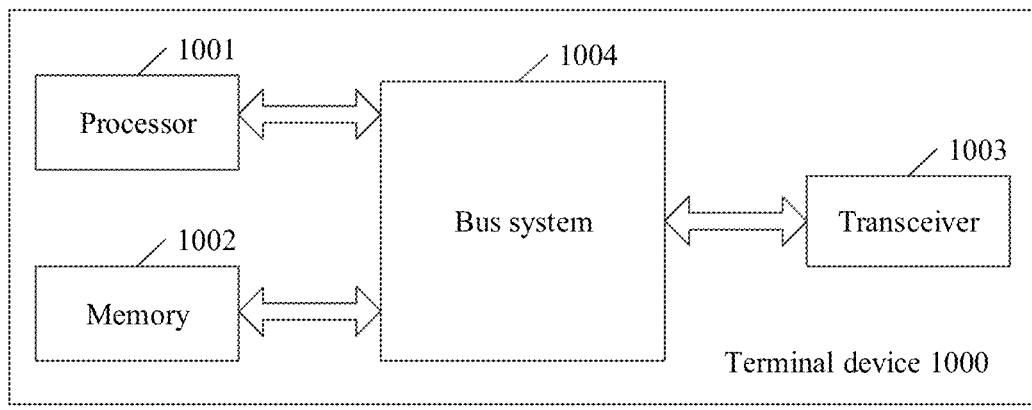
FIG. 11 is a schematic structural diagram of a terminal device according to an embodiment of this application.

FIG. 11 is a schematic structural diagram of a terminal device according to an embodiment of this application. As shown in FIG. 11, the terminal device 1000 provided in some embodiments of this application includes a processor 1001, a memory 1002, a transceiver 1003, and a bus system 1004.

The processor 1001, the memory 1002, and the transceiver 1003 are connected by using the bus system 1004.

The memory 1002 is configured to store a program. The program may include program code, and the program code includes computer operation instructions. The memory 1002 includes but is not limited to a random access memory (RAM), a read-only memory (ROM), an erasable programmable read-only memory (EPROM), or a portable read-only memory (compact disc read-only memory, CD-ROM). FIG. 11 shows only one memory. Certainly, a plurality of memories may also be disposed as required. Alternatively, the memory 1002 may be a memory in the processor 1001, which is not limited herein.

The memory 1002 stores the following elements, that is, an executable module, a unit or a data structure, or a subset thereof, or an extended set thereof:

The operation instructions include various operation instructions, and are configured to implement various operations.

An operating system includes various system programs, and is configured to implement various basic services and process hardware-based tasks.

The processor 1001 controls an operation of the terminal device 1000. The processor 1001 may be one or more central processing units (CPU). When the processor 1001 is one CPU, the CPU may be a single-core CPU, or may be a multi-core CPU.

During application, components of the terminal device 1000 are coupled together by using the bus system 1004. In addition to a data bus, the bus system 1004 may further include a power bus, a control bus, and a status signal bus. However, for clear description, various types of buses in FIG. 11 are marked as the bus system 1004. For ease of representation, the terminal device is merely schematically illustrated in FIG. 11.

The method provided in FIG. 2, FIG. 5, or FIG. 9 in the foregoing embodiments of this application, or the method provided in any other embodiment may be applied to the processor 1001, or implemented by the processor 1001. The processor 1001 may be an integrated circuit chip and has a data processing capability. In an implementation process, steps in the foregoing methods can be implemented by using a hardware integrated logical circuit in the processor 1001, or by using instructions in a form of software. The processor 1001 may be a general-purpose processor, a digital signal processor (DSP), an application-specific integrated circuit (ASIC), a field-programmable gate array (FPGA) or another programmable logic device, a discrete gate or transistor logic device, or a discrete hardware component, and may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 1002. The processor 1001 reads data in the memory 1002, and performs, by using hardware of the processor 1001, the method steps of the terminal device that are described in FIG. 2, FIG. 5, or FIG. 9, or the method steps of the terminal device that are described in the foregoing embodiments.

The terminal device in this application includes but is not limited to a smartphone, a vehicle-mounted apparatus, a personal computer, an artificial intelligence device, a tablet computer, a personal digital assistant, a smart wearable device (for example, a smart watch, a smart band, or smart glasses), a smart television (or referred to as a smart big screen, a smart screen, a big screen TV, or the like), an intelligent voice device (such as a smart speaker), a virtual reality/mixed reality/enhanced display device, and the like.

An embodiment of this application further provides a computer program product, where the computer program product includes computer program code, and when the computer program code is run on a computer, the computer is enabled to perform the method described in any one of the foregoing embodiments.

An embodiment of this application further provides a chip, including a processor. The processor is configured to read and execute a computer program stored in a memory, to perform the video super-resolution processing method in any possible implementation in FIG. 2, FIG. 5, or FIG. 9. Optionally, the chip further includes the memory, and the memory is connected to the processor by using a circuit or a wire. Further optionally, the chip further includes a communications interface, and the processor is connected to the communications interface. The communications interface is configured to receive data and/or information that needs to be processed. The processor obtains the data and/or information from the communications interface, processes the data and/or information, and outputs a processing result through the communications interface. The communications interface may be an input/output interface.

Optionally, the processor and the memory may be physically independent units, or the memory may be integrated with the processor.

A person of ordinary skill in the art may understand that all or some of the processes of the methods in the embodiments may be implemented by a computer program instructing related hardware. The program may be stored in a computer-readable storage medium. When the program runs, the processes of the methods in the embodiments may be performed. The foregoing storage medium includes any medium that can store program code, such as a ROM or a random access memory RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A video super-resolution processing method, comprising:
   obtaining encoded information of a coding block in a video stream,
   wherein the coding block belongs to an image frame in the video stream;
   the image frame in the video stream comprises a plurality of coding blocks;
   the encoded information comprises a reference image frame index, a matched coding block index, and an inter-frame prediction marker; and a matched coding block identified by the matched coding block index is a coding block that is in a reference image frame identified by the reference image frame index and that has a minimum pixel difference from the coding block;
   determining an inter-frame prediction mode of the coding block based on the inter-frame prediction marker, and determining a super-resolution pixel block of the coding block based on the inter-frame prediction mode and pixel information of the matched coding block, wherein the super-resolution pixel block is a pixel block obtained after a super-resolution processing is performed on pixel information of the coding block; and
   stitching super-resolution pixel blocks of coding blocks that belong to a same image frame in the video stream to obtain a super-resolution image, wherein the super-resolution image is used for generating a super-resolution video.

2. The method according to claim 1, wherein the pixel information of the coding block is the same as the pixel information of the matched coding block; and
   the determining the super-resolution pixel block of the coding block based on the inter-frame prediction mode and the pixel information of the matched coding block comprises:
   when the inter-frame prediction mode is a first-type prediction mode, determining a matched super-resolution pixel block of the matched coding block as the super-resolution pixel block of the coding block, wherein the matched super-resolution pixel block comprises a pixel block obtained after the super-resolution processing is performed on the pixel information of the matched coding block.

3. The method according to claim 1, wherein the determining the super-resolution pixel block of the coding block based on the inter-frame prediction mode and the pixel information of the matched coding block comprises:
   when the inter-frame prediction mode is a second-type prediction mode, determining a pixel prediction residual of the coding block, and determining the pixel information of the coding block based on the pixel information of the matched coding block and the pixel prediction residual; and
   performing the super-resolution processing on the pixel information of the coding block, to obtain the super-resolution pixel block of the coding block.

4. The method according to claim 3, wherein the performing of the super-resolution processing on the pixel information of the coding block, to obtain the super-resolution pixel block of the coding block comprises:
   obtaining a first pixel region in the coding block, wherein pixel information of the first pixel region is pixel information in the pixel information of the coding block except for pixel information of a second pixel region, and the second pixel region is a pixel region of a preset size in the coding block;

performing pixel padding on the first pixel region, and performing the super-resolution processing on the pixel information of the post-pixel-padding first pixel region to obtain a first pixel block corresponding to the coding block; and performing the super-resolution processing on the pixel information of the coding block, and stitching the first pixel block and the pixel block obtained after the super-resolution processing is performed on the pixel information of the coding block, to obtain the super-resolution pixel block of the coding block.

5. The method according to claim 4, wherein the obtaining the first pixel region in the coding block comprises:
  determining the second pixel region of the preset size in the coding block, and determining, as the first pixel region, a region that is in the coding block and that does not overlap with the second pixel region.

6. The method according to claim 1, wherein the encoded information further comprises at least one of a motion vector predictor (MVP) or a motion vector difference (MVD); and
  the stitching super-resolution pixel blocks of the coding blocks that belong to the same image frame in the video stream to obtain the super-resolution image comprises:
    determining a motion vector (MV) of the coding block based on the inter-frame prediction mode, and at least one of the MVP or the MVD;
    determining, based on the MV and a location of the matched coding block in the reference image frame, a location of the coding block in the image frame to which the coding block belongs; and
    stitching the super-resolution pixel blocks of the coding blocks that belong to the same image frame in the video stream based on locations of the coding blocks in the image frame to which the coding blocks belong, to obtain the super-resolution image of the image frame to which the coding blocks belong.

7. The method according to claim 1, wherein a frame type of the image frame to which the coding block belongs is a P frame.

8. A terminal device, comprising a processor and a memory, wherein the memory is configured to store a computer program; the computer program comprises program instructions; and when the processor runs the program instructions, the terminal device is enabled to perform:
  obtaining encoded information of a coding block in a video stream, wherein the coding block belongs to an image frame in the video stream; the image frame in the video stream comprises a plurality of coding blocks; the encoded information comprises a reference image frame index, a matched coding block index, and an inter-frame prediction marker; and a matched coding block identified by the matched coding block index is a coding block that is in a reference image frame identified by the reference image frame index and that has a minimum pixel difference from the coding block;
  determining an inter-frame prediction mode of the coding block based on the inter-frame prediction marker, and determining a super-resolution pixel block of the coding block based on the inter-frame prediction mode and pixel information of the matched coding block, wherein the super-resolution pixel block is a pixel block obtained after a super-resolution processing is performed on pixel information of the coding block; and
  stitching super-resolution pixel blocks of coding blocks that belong to a same image frame in the video stream to obtain a super-resolution image, wherein the super-resolution image is used for generating a super-resolution video.

9. The terminal device according to claim 8, wherein the pixel information of the coding block is the same as the pixel information of the matched coding block; and
  the determining the super-resolution pixel block of the coding block based on the inter-frame prediction mode and the pixel information of the matched coding block comprises:
    when the inter-frame prediction mode is a first-type prediction mode, determining a matched super-resolution pixel block of the matched coding block as the super-resolution pixel block of the coding block, wherein the matched super-resolution pixel block comprises a pixel block obtained after the super-resolution processing is performed on the pixel information of the matched coding block.

10. The terminal device according to claim 8, wherein the determining the super-resolution pixel block of the coding block based on the inter-frame prediction mode and pixel information of the matched coding block comprises:
    when the inter-frame prediction mode is a second-type prediction mode, determining a pixel prediction residual of the coding block, and determining the pixel information of the coding block based on the pixel information of the matched coding block and the pixel prediction residual; and
    performing the super-resolution processing on the pixel information of the coding block, to obtain the super-resolution pixel block of the coding block.

11. The terminal device according to claim 10, wherein the performing of the super-resolution processing on the pixel information of the coding block, to obtain the super-resolution pixel block of the coding block comprises:
    obtaining a first pixel region in the coding block, wherein pixel information of the first pixel region is pixel information in the pixel information of the coding block except for pixel information of a second pixel region, and the second pixel region is a pixel region of a preset size in the coding block;
    performing pixel padding on the first pixel region, and performing the super-resolution processing on the pixel information of the post-pixel-padding first pixel region to obtain a first pixel block corresponding to the coding block; and
    performing the super-resolution processing on the pixel information of the coding block, and stitching the first pixel block and the pixel block obtained after the super-resolution processing is performed on the pixel information of the coding block, to obtain the super-resolution pixel block of the coding block.

12. The terminal device according to claim 11, wherein the obtaining the first pixel region in the coding block comprises:
  determining the second pixel region of the preset size in the coding block, and determining, as the first pixel region, a region that is in the coding block and that does not overlap with the second pixel region.

13. The terminal device according to claim 8, wherein the encoded information further comprises a motion vector predictor (MVP) or a motion vector difference (MVD); and
  the stitching super-resolution pixel blocks of the coding blocks that belong to the same image frame in the video stream to obtain the super-resolution image comprises:

determining a motion vector (MV) of the coding block based on the inter-frame prediction mode, and at least one of the MVP or the MVD;

determining, based on the MV and a location of the matched coding block in the reference image frame, a location of the coding block in the image frame to which the coding block belongs; and stitching the super-resolution pixel blocks of the coding blocks that belong to the same image frame in the video stream based on locations of the coding blocks in the image frame to which the coding blocks belong, to obtain the super-resolution image of the image frame to which the coding blocks belong.

14. The terminal device according to claim 8, wherein a frame type of the image frame to which the coding block belongs is a P frame.

15. A non-transitory computer-readable storage medium, wherein the computer-readable storage medium stores computer program instructions; and when the computer program instructions are run on a computer, the computer is enabled to perform:

obtaining encoded information of a coding block in a video stream, wherein the coding block belongs to an image frame in the video stream; one image frame in the video stream comprises a plurality of coding blocks; the encoded information comprises a reference image frame index, a matched coding block index, and an inter-frame prediction marker; and a matched coding block identified by the matched coding block index is a coding block that is in a reference image frame identified by the reference image frame index and that has a minimum pixel difference from the coding block;

determining an inter-frame prediction mode of the coding block based on the inter-frame prediction marker, and determining a super-resolution pixel block of the coding block based on the inter-frame prediction mode and pixel information of the matched coding block, wherein the super-resolution pixel block is a pixel block obtained after a super-resolution processing is performed on pixel information of the coding block; and stitching super-resolution pixel blocks of coding blocks that belong to a same image frame in the video stream to obtain a super-resolution image, wherein the super-resolution image is used for generating a super-resolution video.

16. The non-transitory computer-readable storage medium according to claim 15, wherein the pixel information of the coding block is the same as the pixel information of the matched coding block; and the determining the super-resolution pixel block of the coding block based on the inter-frame prediction mode and the pixel information of the matched coding block comprises:

when the inter-frame prediction mode is a first-type prediction mode, determining a matched super-resolution pixel block of the matched coding block as the super-resolution pixel block of the coding block, wherein the matched super-resolution pixel block comprises a pixel block obtained after the super-resolution processing is performed on the pixel information of the matched coding block.

17. The non-transitory computer-readable storage medium according to claim 15, wherein the determining the super-resolution pixel block of the coding block based on the inter-frame prediction mode and pixel information of the matched coding block comprises:

when the inter-frame prediction mode is a second-type prediction mode, determining a pixel prediction residual of the coding block, and determining the pixel information of the coding block based on the pixel information of the matched coding block and the pixel prediction residual; and performing the super-resolution processing on the pixel information of the coding block, to obtain the super-resolution pixel block of the coding block.

18. The non-transitory computer-readable storage medium according to claim 17, wherein the performing of the super-resolution processing on the pixel information of the coding block, to obtain the super-resolution pixel block of the coding block comprises:

obtaining a first pixel region in the coding block, wherein pixel information of the first pixel region is pixel information in the pixel information of the coding block except for pixel information of a second pixel region, and the second pixel region is a pixel region of a preset size in the coding block;

performing pixel padding on the first pixel region, and performing the super-resolution processing on the pixel information of the post-pixel-padding first pixel region to obtain a first pixel block corresponding to the coding block; and performing the super-resolution processing on the pixel information of the coding block, and stitching the first pixel block and the pixel block obtained after the super-resolution processing is performed on the pixel information of the coding block, to obtain the super-resolution pixel block of the coding block.

19. The non-transitory computer-readable storage medium according to claim 18, wherein the obtaining the first pixel region in the coding block comprises:

determining the second pixel region of the preset size in the coding block, and determining, as the first pixel region, a region that is in the coding block and that does not overlap with the second pixel region.

20. The non-transitory computer-readable storage medium according to claim 15, wherein the encoded information further comprises at least one of a motion vector predictor (MVP) or a motion vector difference (MVD); and the stitching super-resolution pixel blocks of the coding blocks that belong to the same image frame in the video stream to obtain the super-resolution image comprises:

determining a motion vector (MV) of the coding block based on the inter-frame prediction mode, and at least one of the MVP or the MVD;

determining, based on the MV and a location of the matched coding block in the reference image frame, a location of the coding block in the image frame to which the coding block belongs; and stitching the super-resolution pixel blocks of the coding blocks that belong to the same image frame in the video stream based on locations of the coding blocks in the image frame to which the coding blocks belong, to obtain the super-resolution image of the image frame to which the coding blocks belong.

* * * * *